US012793302B2

(12) United States Patent

Moriakov et al.

(10) Patent No.: US 12,793,302 B2
(45) Date of Patent: Nov. 10, 2026

(54) LEARNED INVERTIBLE RECONSTRUCTION

(71) Applicant: Stichting Het Nederlands Kanker Instituut—Antoni van Leeuwenhoek Ziekenhuis, Amsterdam (NL)

(72) Inventors: Nikita Moriakov, Amsterdam (NL); Jonas Teuwen, Amsterdam (NL); Jan-Jakob Sonke, Amsterdam (NL)

(73) Assignee: Stichting Het Nederlands Kanker Instituut—Antoni Van Leeuwenhoek Ziekenhuis, Amsterdam (NL)

( * ) Notice: Subject to any disclaimer, the term of this patent is extended or adjusted under 35 U.S.C. 154(b) by 178 days.

(21) Appl. No.: 18/838,929

(22) PCT Filed: Feb. 6, 2023

(86) PCT No.: PCT/EP2023/052875

§ 371 (c)(1),
(2) Date: Aug. 15, 2024

(87) PCT Pub. No.: WO2023/156242

PCT Pub. Date: Aug. 24, 2023

(65) Prior Publication Data

US 2025/0191252 A1 Jun. 12, 2025

(30) Foreign Application Priority Data

Feb. 17, 2022 (NL) ..................................... 2030984

(51) Int. Cl.
*G06T 11/00* (2026.01)
*G06T 12/20* (2026.01)

(52) U.S. Cl.
CPC ........ *G06T 12/20* (2026.01); *G06T 2211/424* (2013.01); *G06T 2211/441* (2023.08)

(58) Field of Classification Search
CPC ......... G06T 2211/424; G06T 2211/441; G06T 12/20
See application file for complete search history.

(56) References Cited

U.S. PATENT DOCUMENTS

2019/0108441 A1 4/2019 Thibault et al.
2020/0027252 A1 1/2020 Ye et al.
(Continued)

FOREIGN PATENT DOCUMENTS

CN 110751701 A 2/2020
CN 112348936 A 2/2021
(Continued)

OTHER PUBLICATIONS

Ardizzone et al.: Analyzing Inverse Problems with Invertible Neural Networks, Published as a conference paper at ICLR 2019, arXiv:1808.04730v3 [cs.LG] Feb. 6, 2019.
(Continued)

*Primary Examiner* — Michael J Vanchy, Jr.
(74) *Attorney, Agent, or Firm* — Ipsilon USA—NLO

(57) ABSTRACT

Provided herein is a system for image reconstruction having a memory for storing data and instructions and a processor system. The system obtains measured data defined in a dual space, the measured data relating to a primal space. The system determines dual parameters defined in the dual space based on the measured data and primal parameters defined in the primal space based on back-projection of the dual parameters. The system updates the primal parameters and the dual parameters, by obtaining auxiliary dual parameters by forward-projecting the primal parameters, applying a dual-space learned invertible operator to the dual parameters, based on the auxiliary dual parameters, obtaining auxiliary primal parameters by back-projecting the dual parameters, and applying a primal-space learned invertible operator to the primal parameters, based on the auxiliary
(Continued)

primal parameters. The system determines an image in the primal space based on the updated primal parameters.

14 Claims, 11 Drawing Sheets

(56) References Cited

U.S. PATENT DOCUMENTS

| | | | | |
|---|---|---|---|---|
| 2020/0196973 | A1 | 6/2020 | Zhou et al. | |
| 2021/0007694 | A1 | 1/2021 | Hein et al. | |
| 2021/0074036 | A1* | 3/2021 | Fuchs | A61B 6/032 |
| 2021/0085208 | A1* | 3/2021 | Trzasko | A61B 5/055 |
| 2021/0118200 | A1 | 4/2021 | Akcakaya et al. | |

FOREIGN PATENT DOCUMENTS

| | | | |
|---|---|---|---|
| CN | 112396672 | A | 2/2021 |
| EP | 3417787 | A1 | 12/2018 |
| WO | 2018187020 | A1 | 10/2018 |
| WO | 2018187662 | A1 | 10/2018 |
| WO | 2018234503 | A1 | 12/2018 |

OTHER PUBLICATIONS

Rudzusika et al.: Invertible Learned Primal-Dual, NeurIPS 2021 Workshop on Deep Learning and Inverse Problems, Oct. 19, 2021.
Adler et al.: Learned Primal-dual Reconstruction, arXiv:1707.06474v2 [math.OC] Nov. 24, 2017.
Lonning et al.: Recurrent Inference Machines for Reconstructing Heterogenous MRI Data, Preprint submitted to Medical Image Analysis, Oct. 23, 2018.
Gomez et al.: The Reversible Residual Network: Backpropagation Without Storing Activations, 31st Conference on Neural Information Processing Systems (NIPS 2017).
Rudzusika et al.: Invertible Learned Primal-Dual, KTH Royal Institute of Technology, University of Cambridge, Conference Poster.
Putzky et al.: Invert to Learn to Invert, 33rd Conference on Neural Information Processing Systems (NeurIPS 2019).
Hauptman et al.: Multi-Scale Learned Iterative Reconstruction, arXiv:1908.00936v3 [eess.IV] Apr. 20, 2020.
Adler, J. et al: "Learned Primal-dual Reconstruction", IEEE Transactions on Medical Imaging (2018), arXiv:1707.06474.
Arridge, S. et al: "Solving inverse problems using data-driven models", Acta Numerica 2019, pp. 1-174, https://doi.org/10.1017/S0962492919000059.
Beauferris, Y. et al: "Multi-Coil MRI Reconstruction Challenge—Assessing Brain MRI Reconstruction Models and Their Generalizability to Varying Coil Configurations", Methods, Frontiers in Neuroscience, Jul. 6, 2022.
Boyd, D.W.: "the power methods for Norms", Linear Algebra and its Applications 9, 95-101 (1974).
Chambolle, A. et al: "A first-order primal-dual algorithm for convex problems with applications to imaging", 2010. hal-00490826.
Cicek, O. et al: "3D U-Net: Learning Dense Volumetric Segmentation from Sparse Annotation", S. Ourselin et al (Eds.): MICCAI 2016, Part II, LNCS 9901, pp. 424-432, 2016.
Dawood, A. et al: "Cone beam CT in dental practice", British Dental Journal, vol. 207, No. 1, Jul. 11, 2009.
Feldkamp, L.A. et al: "Practical cone-beam algorithm", J. Opt. Soc. Am. A/vol. 1, No. 6/Jun. 1984.
Floridi, C. et al: "C-arm cone-beam computed tomography in interventional oncology: technical aspects and clinical applications", Radiol Med. Jul. 2014 ; 119(7): 521-532.
Gomez, A.N. et al: "The Reversible Residual Network: Backpropagation Without Storing Activations", 31st Conference on Neural Information Processing Systems (NIPS 2017), Long Beach, CA, USA.
Hauptmann, A. et al: "Multi-Scale Learned Iterative Reconstruction", IEEE Trans Comput Imaging. 2020;6:843-856. doi: 10.1109/TCI.2020.2990299. Epub Apr. 27, 2020. PMID: 33644260; PMCID: PMC7116830.
Jaffray, D.A. et al: "Flat-panel Cone-beam Computed Tomography for Image-guided Radiation Therapy", Int. J. Radiation Oncology Biol. Phys, vol. 53, No. 5, pp. 1337-1349, 2002.
Kyong Hwan Jin et al: "Deep Convolutional Neural NEtwork for Inverse Problems in Imaging", IEEE Transactions on Image Processing, vol. 26, No. 9, Sep. 2017.
Kingma, Diederik P. and Jimmy Ba. "Adam: A Method for Stochastic Optimization." CoRR abs/1412.6980 (2014).
Létourneau, D. et al: "Cone-beam-CT guided radiation therapy: technical implementation", Radiotherapy and Oncology 75 (2005) 279-286.
Lønning K, Putzky P, Sonke JJ, Reneman L, Caan MWA, Welling M. Recurrent inference machines for reconstructing heterogeneous MRI data. Med Image Anal. Apr. 2019;53:64-78. doi: 10.1016/j.media.2019.01.005. Epub Jan. 18, 2019. PMID: 30703579.
Maier, J. et al: "Deep Scatter Estimation (DSE): Accurate Real-Time Scatter Estimation for X-Ray CT Using a Deep Convolutional Neural Network", Journal of Nondestructive Evaluation (2018) 37:57.
Muckley MJ, et al. Results of the 2020 fastMRI Challenge for Machine Learning MR Image Reconstruction. IEEE Trans Med Imaging. Sep. 2021;40(9):2306-2317. doi: 10.1109/TMI.2021.3075856. Epub Aug. 31, 2021. PMID: 33929957; PMCID: PMC8428775.
Adam Paszke et al. 2019. PyTorch: an imperative style, high-performance deep learning library. Proceedings of the 33rd International Conference on Neural Information Processing Systems. Curran Associates Inc., Red Hook, NY, USA, Article 721, 8026-8037.
H. Pinckaers, B. van Ginneken and G. Litjens, "Streaming Convolutional Neural Networks for End-to-End Learning With Multi-Megapixel Images," in IEEE Transactions on Pattern Analysis and Machine Intelligence, vol. 44, No. 3, pp. 1581-1590, Mar. 1, 2022, doi: 10.1109/TPAMI.2020.3019563.
Ramzi, Z.; Ciuciu, P.; Starck, J.-L. Benchmarking MRI Reconstruction Neural Networks on Large Public Datasets. Appl. Sci. 2020, 10, 1816. https://doi.org/10.3390app10051816.
Sen Sharma K, Gong H, Ghasemalizadeh O, Yu H, Wang G, Cao G. Interior micro-CT with an offset detector. Med Phys. Jun. 2014;41(6):061915. doi: 10.1118/1.4876724. PMID: 24877826; PMCID: PMC4039736.
Sonke JJ, Aznar M, Rasch C. Adaptive Radiotherapy for Anatomical Changes. Semin Radiat Oncol. Jul. 2019;29(3):245-257. doi: 10.1016/j.semradonc.2019.02.007. PMID: 31027642.
Syben C, Michen M, Stimpel B, Seitz S, Ploner S, Maier AK. Technical Note: PYRO-NN: Python reconstruction operators in neural networks. Med Phys. Nov. 2019;46(11):5110-5115. doi: 10.1002/mp.13753. Epub Aug. 27, 2019. PMID: 31389023; PMCID: PMC6899669.
Teuwen J, Moriakov N, Fedon C, Caballo M, Reiser I, Bakic P, Garcia E, Diaz O, Michielsen K, Sechopoulos I. Deep learning reconstruction of digital breast tomosynthesis images for accurate breast density and patient-specific radiation dose estimation. Med Image Anal. Jul. 2021;71:102061. doi: 10.1016/j.media.2021.102061. Epub Apr. 15, 2021. PMID: 33910108.
Heang K. Tuy: "An Inversion Formula for Cone-Beam Reconstruction", SIAM Journal on Applied Mathematics, Jun. 1983, vol. 43, No. 3, pp. 546-552.
Van Aarle W, Palenstijn WJ, Cant J, Janssens E, Bleichrodt F, Dabravolski A, De Beenhouwer J, Joost Batenburg K, Sijbers J. Fast and flexible X-ray tomography using the ASTRA toolbox. Opt Express. Oct. 31, 2016;24(22):25129-25147. doi: 10.1364/OE.24.025129. PMID: 27828452.

* cited by examiner

Fig. 5

| 2*Method | Thorax CT | | H&N CT | | 2*Weight count | 2*Optimizer steps | 2*Batch size |
|---|---|---|---|---|---|---|---|
| | PSNR | SSIM | PSNR | SSIM | | | |
| FBP (small FOV) | 15.289 | 0.572 | 27.647 | 0.721 | - | - | - |
| TV (small FOV) | 27.370 | 0.771 | 33.903 | 0.866 | - | - | - |
| U-Net (small FOV) | 32.405 | 0.803 | 36.433 | 0.879 | 23341k | 284640 | 1 |
| LIRE (small FOV) | **33.345** | **0.885** | **37.941** | **0.971** | 24497k | 6798 | 8 |
| FBP (large FOV) | 20.051 | 0.662 | 22.396 | 0.711 | - | - | - |
| TV (large FOV) | 29.237 | 0.793 | 37.862 | 0.945 | - | - | - |
| U-Net (large FOV) | 34.297 | 0.849 | 37.064 | 0.885 | 23341k | 287040 | 1 |
| LIRE (large FOV) | **34.432** | **0.903** | **40.113** | **0.982** | 24497k | 6600 | 8 |

LEARNED INVERTIBLE RECONSTRUCTION

FIELD OF THE INVENTION

The invention relates to a learned invertible reconstruction method and system.

BACKGROUND OF THE INVENTION

Since its inception in 1960s, Computed Tomography (CT) has enjoyed a huge success in medical imaging. It is characterized by a specific acquisition and reconstruction process, in which a set of X-ray projections is first acquired for varying positions of the source and the detector and where X-rays from the source typically form a narrow fan beam. Subsequently, this projection data is processed by a reconstruction algorithm yielding either a two-dimensional slice or a three-dimensional volume. One of the more recent variants of Computed Tomography is the Cone Beam Computed Tomography (CBCT), where X-rays from the source diverge in a wider cone-shaped beam. Both the source and the detector in CBCT typically follow circular orbits around the isocenter, and the detector is a large flat panel array. CBCT is widely used in clinic nowadays in dentistry, interventional radiology, and image-guided radiation therapy, in certain cases replacing the classical CT.

Cone Beam CT (CBCT) is a crucial imaging modality in many fields in medicine. However, its potential is not fully utilized due to the generally lower imaging quality than conventional CT, and accurate reconstructions are still a challenging task. Reconstruction methods relying on deep learning have attracted a lot of attention recently due to their promising performance for a variety of medical imaging modalities. There are, however, issues that preclude direct application of such methods to CBCT in practice. Firstly, deep learning reconstruction methods become prohibitively memory expensive when working with fully 3D data such as CBCT. Secondly, deep learning reconstruction methods are widely criticised for being trained and evaluated on data from a specific region of interest such as thorax, raising concerns about generalization to other organs.

CBCT reconstruction is a hard problem. Firstly, it is known that the data completeness condition for exact reconstruction of the whole volume is not satisfied for circular source/detector orbits. CBCT also inherits the imaging artifacts of classical CT such as streaking due to photon starvation in highly attenuated areas, which becomes particularly pronounced for repeated lower dose CBCT scans, and beam hardening. Furthermore, scatter-induced artifacts become more prominent due to the large panel size. These issues result in generally poor Hounsfield unit calibration, which is a serious limitation for applications in radiotherapy, where one would ideally use a daily CBCT scan for treatment plan adjustment without registration to a prior CT scan. This necessitates, along with other applications, the ongoing research on CBCT reconstruction.

In recent years, reconstruction methods based on deep learning have attracted a lot of interest in the community and demonstrated very promising results in public reconstruction challenges. For example, in the recent MRI reconstruction challenges, deep learning methods have strongly outperformed the classical baselines. Generally speaking, any medical image reconstruction task can be viewed as an abstract inverse problem for a suitable forward operator, and different approaches have been proposed in the literature for solving such problems with deep learning.

One of the possible ways to apply deep learning to CT or CBCT reconstruction problems is to use a neural network as a learned post-processing operator for a classical reconstruction method such as filtered back-projection (FBP). Jin, K. H., McCann, M. T., Froustey, E., Unser, M., 2017, Deep convolutional neural network for inverse problems in imaging, IEEE Transactions on Image Processing 26, 4509-4522, demonstrated that such learned post-processing can increase the reconstruction quality. At the same time, the neural network in this case does not have direct access to the raw data, thus it can fail to recover from some of the artifacts introduced by the classical reconstruction algorithm.

A rich family of alternative methods is given by learned iterative schemes. Such schemes are often inspired by classical iterative schemes, combining the knowledge of the forward operator and its adjoint with neural networks that complement these schemes by e.g. filtering noise in the update term.

Adler, J., Öktem, O., 2018, Learned Primal-Dual Reconstruction, IEEE Transactions on Medical Imaging 37, 1322-1332 describes an example of such schemes for two-dimensional CT, called Learned Primal-Dual (LPD) algorithm, which was inspired by the Primal-Dual Hybrid Gradient method described in Chambolle, A., Pock, T., 2011. A first-order primal-dual algorithm for convex problems with applications to imaging. J. Math. Imaging Vis. 40, 120-145. In LPD, computations are performed by primal blocks in the image domain and by dual blocks in the projection domain, where each block is a small residual convolutional neural network, and the blocks are connected by projection and backprojection operators, enabling end-to-end training. Such architecture allows to filter noise efficiently, since raw projection data is provided to the dual blocks. Extensions of LPD to other modalities have been proposed as well, e.g. two-dimensional Digital Breast Tomosynthesis and two-dimensional MRI reconstruction.

Gomez, A. N., Ren, M., Urtasun, R., Grosse, R. B., 2017. The reversible residual network: Backpropagation without storing activations, in: Guyon, I., Luxburg, U. V., Bengio, S., Wallach, H., Fergus, R., Vishwanathan, S., Garnett, R. (Eds.), Advances in Neural Information Processing Systems, Curran Associates, Inc describes reversible residual neural networks.

Pinckaers, H., van Ginneken, B., Litjens, G., 2019, Streaming convolutional neural networks for end-to-end learning with multi-megapixel images. arXiv e-prints, arXiv: 1911.04432 describes a patch-wise computation strategy for a special case of image classification CNNs. Lonning, K., Putzky, P., Sonke, J. J., Reneman, L., Caan, M. W., Welling, M., 2019, Recurrent inference machines for reconstructing heterogeneous mri data, Medical Image Analysis 53, 64-78, discloses a gradient log-likelihood term in Recurrent Inference Machines.

There would be a desire for a learned primal-dual reconstruction method that provides improved reconstruction result and/or that can be trained more efficiently. Moreover, there would be a desire for an improved truly 3D learned reconstruction algorithm.

SUMMARY OF THE INVENTION

There would be a desire for a reconstruction method that provides an improved reconstruction result and/or that can be trained more efficiently.

According to a first aspect of the present invention, a system is provided for image reconstruction using a learned iterative scheme, the system comprising a memory for storing data and instructions; and a processor system configured to control, when executing the instructions:

obtaining (201) measured data defined in a dual space, the measured data relating to a primal space;

determining (203) dual parameters defined in the dual space based on the measured data;

determining (203) primal parameters defined in the primal space based on the dual parameters;

identifying (302) a plurality of primal patches, each primal patch representing a sub-volume of the primal space, wherein the primal space is divided into the plurality of the primal patches;

identifying (302) a plurality of dual patches, each dual patch representing a subset of the dual space, wherein the dual space is divided into the plurality of the dual patches;

iteratively (210) updating the primal parameters (206) and the dual parameters (205), by iteration of applying (205) a dual-space learned invertible operator to the dual parameters, in dependence on at least part of the dual parameters, to obtain updated dual parameters, wherein the dual-space learned invertible operator is calculated separately for each dual patch, and applying (206) a primal-space learned invertible operator to the primal parameters, in dependence on at least part of the primal parameters, to obtain updated primal parameters, wherein the primal-space learned invertible operator is calculated separately for each primal patch; and determining (207) an image in the primal space based on the updated primal parameters.

The invertible nature of the dual-space learned invertible operator and the primal-space invertible operator allows to calculate gradients of model parameters more efficiently. The patches reduce the amount of memory necessary to apply the learned invertible operators. Therefore, training of the learned operators is more effective. This may lead to more accurate and/or more efficient reconstruction. The invertibility of the learned operators allows to reduce the amount of memory needed during the training of the learned operators. Moreover, the patch-wise calculation of the learned invertible operators helps to reduce the memory needed to perform said calculations.

The plurality of patches may overlap each other. This helps to ensure correct calculation for each patch, in particular to calculate e.g. convolutions.

The subset of the dual space may comprise an area of a two-dimensional projection image, as well as one or more projection directions. For example, the subset of the dual space may comprise an area of a two-dimensional projection image and an angular range of projection directions, thus forming a rectangular region in dual space. This allows for an effective patch-wise calculation of e.g. convolutions and/or filters.

The processor system may be further configured to control, in each iteration: calculating auxiliary dual parameters based on at least part of the primal parameters, wherein the dual-space learned invertible operator is further dependent on the auxiliary dual parameters; and calculating auxiliary primal parameters based on at least part of the dual parameters, wherein the primal-space learned invertible operator is further dependent on the auxiliary primal parameters. This may improve the reconstruction by providing a way for the dual-space learned invertible operator to take into account at least part of the primal parameters, and for the primal-space learned invertible operator to take into account at least part of the dual parameters.

The calculating of the auxiliary dual parameters may comprise forward-projecting the second primal parameters. The calculating of the auxiliary primal parameters may comprise back-projecting the second dual parameters. This provides an efficient manner to calculate the auxiliary dual parameters and the auxiliary primal parameters.

The processor system may be further configured to control: organizing the dual parameters in a plurality of dual channels, each dual channel corresponding to the dual space, and dividing the dual channels into first dual channels containing first dual parameters and second dual channels containing second dual parameters; and organizing the primal parameters in a plurality of primal channels, each primal channel corresponding to the primal space, and dividing the primal channels into first primal channels containing first primal parameters and second primal channels containing second primal parameters, wherein the applying the dual-space learned invertible operator to the dual parameters comprises updating the second dual parameters based on an output of a dual-space learned model without changing the first dual parameters, wherein the output of the dual-space learned model is calculated separately for each dual patch, and wherein the applying the primal-space learned invertible operator to the primal parameters comprises updating the second primal parameters based on an output of a primal-space learned model without changing the first primal parameters, wherein the output of the primal-space learned model is calculated separately for each primal patch. This provides a particularly flexible and efficient way to implement the learned invertible operators.

The processor system may be further configured to control permuting the dual channels to mix the first dual channels and the second dual channels; and permuting the primal channels to mix the first primal channels and the second primal channels. Mixing the channels helps to obtain better reconstruction results with the learned invertible operators.

The processor system may be further configured to control, in each iteration: updating the image in the primal space based on the updated primal parameters. This way, the image may be stored in each intermediate step, which may be helpful to calculate gradients when training the learned iterative scheme.

The processor system may be further configured to control obtaining an updated image in the primal space by updating the image in the primal space based on the updated primal parameters. The calculating of the auxiliary dual parameters may further comprise forward-projecting the updated image in the primal space. Moreover, the primal-space learned invertible operator may be further dependent on the updated image. This helps to provide improved reconstructions.

The processor system may be further configured to control calculating an error term based on the updated image in the primal space and the measured data defined in the dual space, wherein at least one of the primal-space learned invertible operator and the dual-space learned invertible operator is dependent on the error term. This may help the respective learned invertible operator to correct the error in the next iteration.

The system of any preceding claim, wherein the measured data comprise cone-beam X-ray projection data. One very suitable application of the present learned iterative scheme is reconstruction of cone-beam projection data, such as cone-beam X-ray projection data, for cone-beam computed tomography (CBCT).

The processor system may be further configured to control training the dual-space learned invertible operator and the primal-space learned invertible operator, based on a train set. By the training, the learning of the learned invertible operators takes place by choosing the parameters of the learned invertible operators to minimize an error when the learned iterative scheme is applied to samples from the train set.

According to another aspect of the invention, a method of image reconstruction using a learned iterative scheme is provided. The method comprises

- obtaining measured data defined in a dual space, the measured data relating to a primal space;
- determining dual parameters defined in the dual space based on the measured data;
- determining primal parameters defined in the primal space based on the dual parameters;
- identifying (302) a plurality of primal patches, each primal patch representing a sub-volume of the primal space, wherein the primal space is divided into the plurality of the primal patches;
- identifying (302) a plurality of dual patches, each dual patch representing a subset of the dual space, wherein the dual space is divided into the plurality of the dual patches;
- iteratively updating the primal parameters and the dual parameters, by iteration of
  - applying a dual-space learned invertible operator to the dual parameters, in dependence on at least part of the dual parameters, to obtain updated dual parameters, wherein the dual-space learned invertible operator is calculated separately for each patch, and
  - applying a primal-space learned invertible operator to the primal parameters, in dependence on at least part of the primal parameters, to obtain updated primal parameters, wherein the primal-space learned invertible operator is calculated separately for each patch; and
- determining an image in the primal space based on the updated primal parameters.

Another aspect of the invention provides a computer program product comprising instructions, stored on a storage media, to cause a computer system, when executing the instructions, to perform the method set forth.

The person skilled in the art will understand that the features described above may be combined in any way deemed useful. Moreover, modifications and variations described in respect of the system may likewise be applied to the method and to the computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings. The drawings are diagrammatic and may not be drawn to scale. Throughout the drawings, similar items may be marked with the same reference numerals.

FIG. 5 shows a table with test results on thorax CT and head & neck.

DETAILED DESCRIPTION OF EMBODIMENTS

Figure 1:
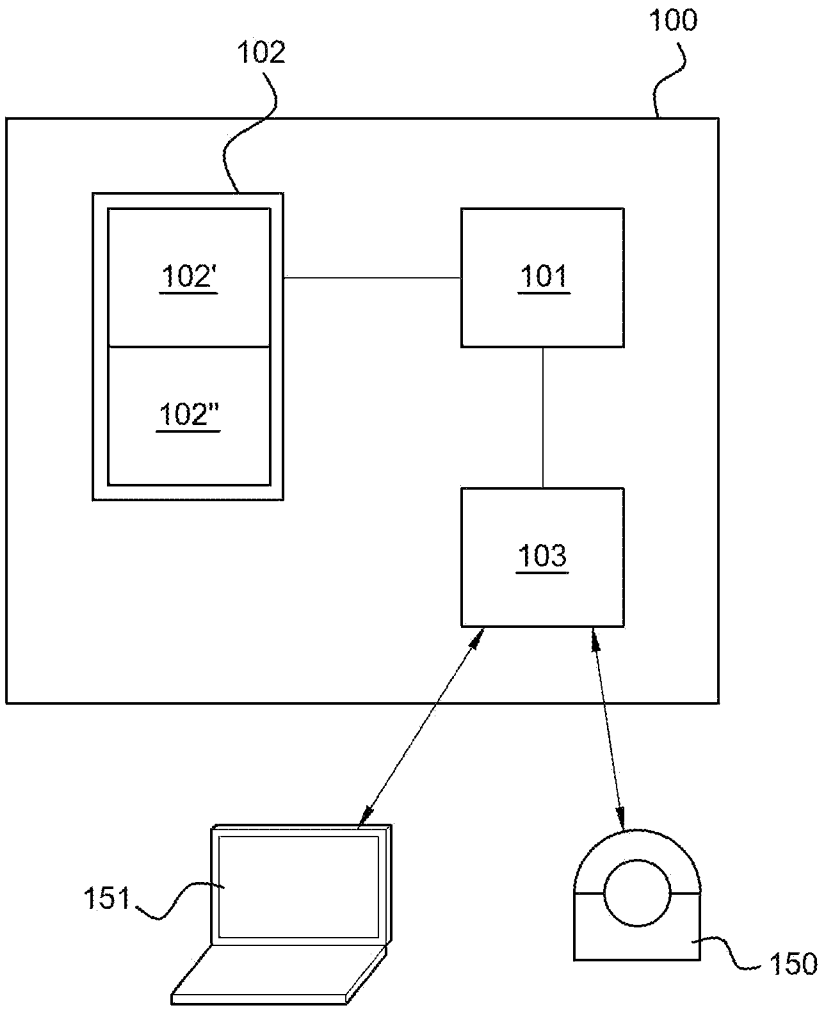
FIG. 1 shows a block diagram of a system for reconstructing an image using a learned invertible operator and/or training a learned invertible operator.

Certain exemplary embodiments will be described in greater detail, with reference to the accompanying drawings.

The matters disclosed in the description, such as detailed construction and elements, are provided to assist in a comprehensive understanding of the exemplary embodiments. Accordingly, it is apparent that the exemplary embodiments can be carried out without those specifically defined matters. Also, well-known operations or structures are not described in detail, since they would obscure the description with unnecessary detail.

Moreover, the following detailed examples concentrate on cone-beam computed tomography (CBCT) as a highly pertinent example of the present disclosure. However, the techniques of the present disclosure are not limited to CBCT. Indeed, the techniques may be applied to a broader range of computed tomography systems, such as fan-beam CT and spiral CT. Moreover, the techniques may be applied to magnetic resonance imaging (MRI) and other reconstruction systems that have a primal-dual architecture, such as positron emission tomography (PET), single-photon emission computed tomography (SPECT), echography, and sonography.

In this work, we aim to address some of the shortcomings of existing tomographic techniques and propose Learned Invertible Reconstruction (LIRE): a fully learned, partially invertible primal-dual iterative scheme for e.g. Cone Beam CT reconstruction. We drastically reduce memory footprint of the network without sacrificing expressive power. Reversible residual primal-dual blocks and patch-wise computations inside the blocks, allow us to train using clinically-relevant resolutions and projection counts on current consumer hardware. The models may be trained on thorax CT scans and tested using both thorax CT and head & neck CT data. We demonstrate that LIRE outperforms the classical methods and the deep learning baseline on both test sets.

Unfortunately, LPD does not scale to a three-dimensional modality such as CBCT due to memory limitations. Indeed, for a 256×256×256 float tensor a single convolution layer with 96 features would already require 12 GB memory to perform a backpropagation, making it impossible to train LPD on clinically relevant resolutions. Increasing complexity of the primal/dual blocks beyond the simple residual Convolutional Neural Networks would increase memory requirements even further. Therefore, unrolled primal-dual schemes like LPD have not yet been shown to work in 3D for clinically relevant resolution and projection count. An aspect of the present disclosure is to present a scheme for 3D for clinically relevant resolution and projection count.

Certain embodiments provide a practical framework for deep learning-based CBCT reconstruction with clinically-relevant resolution and projection count using a learned iterative scheme that can be trained end-to-end on current consumer GPUs. For example, a GPU of about 24 GB VRAM may be sufficient in certain applications. The framework comprises a learned primal-dual iterative scheme with residual primal-dual blocks. Moreover, a set of optional memory optimization techniques may be embedded in the algorithm.

Different models may be trained for clinical CBCT geometries with differently sized field-of-view. For example, two models may be trained for large and small field of view, respectively. In certain implementations, the large field-of-view may be accomplished by a detector panel with an offset. In clinical CBCT scanners, panel size may be fixed but the panel itself can be offset so that the source-isocenter line intersects the panel off-center. The offset direction is parallel to the direction of rotation in the "detector panel space". Such offset detector panel then would give larger field of view when it goes through a full 360-degree rotation.

The method has been shown to be superior to analytical, iterative, and deep learning baselines. This was tested for certain embodiments, on a test set of thorax CT scans for both field-of-view settings.

Improved out-of-distribution generalization of certain embodiments of the present method compared to a deep learning baseline was demonstrated for both geometries on a test data set of head & neck CT scans, where the method improves upon analytical and iterative baselines as well.

Embodiments comprise a reversible primal-dual iterative scheme. To compute the gradients, only the final latent vectors and the sequence of reconstructions returned by the algorithm may be needed. This allows to use longer schemes.

Certain embodiments make use of the local nature of Convolutional Neural Networks (U-net included). For example, certain embodiments perform patch-wise computations inside the primal-dual blocks during both training and evaluation. During backpropagation, weight gradients received from different patches may be combined, for example by summation, giving correct global gradients for the network weights.

Certain embodiments are able to use 3D U-nets with a relatively high filter count inside the primal blocks. Conceptually, the framework allows to use U-nets in both primal and dual blocks, which can be important for scatter correction but also when applying this framework to other modalities such as MRI.

In certain embodiments, the network has an auxiliary scalar tensor which has the same shape as the reconstructed volume. In this tensor, intensity of a given voxel contains information about the percentage of projections for which the corresponding spatial location is visible. The network may be trained to reconstruct the intensities of all voxels which are visible in at least one projection. This may result in a larger field-of-view than FBP.

In certain embodiments, the reconstruction scheme maintains a separate variable for the current iteration of reconstruction. The algorithm may return all resulting intermediate reconstructions. The training loss may then be computed as the sum of reconstruction losses of these intermediate approximations. This way a better supervision may be realized. Moreover, potential gradient vanishing effects may be reduced. Additionally, the algorithm can be stopped early during inference.

Certain embodiments supply a Landweber update term as additional input for the primal blocks. The Landweber update term is known, by itself, from e.g. Kaipio, J., Somersalo, E., 2005, Statistical and Computational Inverse Problems, volume 160 of Applied Mathematical Sciences. Springer-Verlag, New York. For example, the Landweber update term may be an analytically filtered Landweber term. For example, instead of using a raw Landweber term, a filtered backpropagation may be applied instead of the (unfiltered) backpropagation that appears in the Landweber update term of Line 12 in Algorithm 1. Other variations of the Landweber term and other kinds of update term or error term may be used as alternative to the Landweber term.

CBCT reconstruction can be viewed as an inverse problem. Let $x:z\mapsto x(z)$ be a function specifying the attenuation coefficient for every point $z\in\Omega_X$ in the spatial domain $\Omega_x\subset\mathbb{R}^3$. The circular source rotation orbit is parametrized in the present disclosure as a curve $\gamma:[0,1]\rightarrow\mathbb{R}^3$. Detector position and orientation is specified in the present disclosure as a family of planes $\Omega_\gamma:t\mapsto\Omega_\gamma(t)$ for $t\in[0,1]$, where each such plane is canonically identified with $\mathbb{R}^2$. The line going from the source position $\gamma(t)$ at time step $t\in[0,1]$ to the detector element $u\in\Omega_\gamma(t)$ is denoted in the present disclosure by $L_{t,u}$. The cone-beam transform operator, or simply the projection operator, is then defined as $$\mathcal{P}(x)(t,u)=\int_{L_{t,u}}x(z)dz, \quad (1)$$

therefore, $\mathcal{P}$ is a linear operator mapping functions defined on $\Omega_X$ to functions defined on $[0,1]\times\mathbb{R}^2$. Hermitian adjoint $\mathcal{P}^*$ of $\mathcal{P}$ is called the backprojection operator (it is observed that the Hermitian adjoint may be defined for e.g. suitably defined $L^2$ function spaces).

Noisy CBCT data acquisition process can then be modeled as $$y=\text{Poisson}(I_0\cdot e^{-\mathcal{P}x}), \quad (2)$$

where $I_0$ is the unattenuated X-ray photon count. The inverse problem of CBCT reconstruction is then to determine the tissue attenuation coefficients x given the noisy projection data y.

Disclosed herein, 'learned invertible reconstruction' (hereinafter: LIRE) is a data-driven algorithm, wherein a learned iterative scheme is unrolled and the parameters of this scheme are jointly optimized to minimize expected reconstruction loss over the training dataset. The choice of a particular scheme will, naturally, affect both the performance and the used resources such as GPU memory to train such a scheme.

As disclosed herein, a system for image reconstruction may contain reversible residual neural network layers. In a reversible residual network layer, the input tensor z may be split into tensors $z_1$, $z_2$ along the channel dimension. The output w of the layer is then defined by combining $z_1$ and $z_2+\Lambda(z_1)$ back along the channel dimension, wherein $\Lambda$ is a neural network, for example a Convolutional Neural Network. Herein, $\Lambda(z_1)$ denotes the output of the neural network $\Lambda$ in response to the input $z_1$. Thus, the second tensor $z_2$ is augmented based on the output of the neural network $\Lambda$ in response to the first tensor $z_1$. The output comprises the concatenation of the first tensor $z_1$ and the augmented second tensor $z_2+\Lambda(z_1)$. In such a configuration, the input z can be uniquely restored from the output w up to numerical errors, which are typically negligible in practice for small neural networks. Since the input z can be uniquely restored from the output w, it is not necessary to store intermediate features of the neural network $\Lambda$ prior to the actual computation of gradients for the neural network $\Lambda$.

The inventors additionally realized that for neural networks, which are composed of local operators such as valid convolutions, activation functions, upsamling and downsampling layers, it is possible to partition the input tensor z into patches $z_i$, i=1, . . . , k along the spatial dimensions and compute the output patch-by-patch. In general, for every i it may be also useful to enlarge the patch $z_i$ by adding all tensor elements $\partial z_i \subset z$ within a certain distance to $z_i$ in order to account for the receptive field of the network when computing features for locations inside $z_i$.

An example embodiment of a reconstruction algorithm is given by the function RECONSTRUCT (y, $\mathcal{P}$, $\mathcal{P}$*, θ,V) in Algorithm 1.

Algorithm 1: LIRE

| | |
|---|---|
| procedure RECONSTRUCT($y, \mathcal{P}, \mathcal{P}^*, \theta, V$) | |
| $x_0 \leftarrow \mathcal{P}^*(y)$ | Normalized backprojection init |
| $I \leftarrow []$ | Initialize output list |
| $f \leftarrow x_0^{\oplus 8} \in X^8$ | Initialize primal vector |
| $h \leftarrow y^{\oplus 8} \in U^8$ | Initialize dual vector |
| for $i \leftarrow 1, \ldots, 8$ do | |
| $d_1, d_2 \leftarrow \mathrm{Splt}(h)$ | Split dual channels |
| $p_1, p_2 \leftarrow \mathrm{Splt}(f)$ | Split prime channels |
| $p_{op} \leftarrow \mathcal{P}[p_2, x_{i-1}]^{\oplus})$ | Project $p_2$ and $x_{i-1}$ |
| $d_2 \leftarrow d_2 + \Gamma_{\theta_i^d}([p_{op}, d_1, y]^{\oplus})$ | Update $d_2$ |
| $b_{op} \leftarrow \mathcal{P}^*(d_2)$ | Backproject $d_2$ |
| $LW \leftarrow \mathcal{P}^*(\mathcal{P}(x_{i-1}) - y)$ | Landweber term |
| $p_2 \leftarrow p_2 + \Lambda_{\theta_i^p}([b_{op}, p_1, x_{i-1}, LW, V]^{\oplus})$ | Update $p_2$ |
| $h \leftarrow [d_1, d_2]^{\oplus}$ | Combine new dual |
| $f \leftarrow [p_1, p_2]^{\oplus}$ | Combine new primal |
| $x_i \leftarrow x_{i-1} + \mathrm{Conv3d}(f, \theta_i^o)$ | Update $x_{i-1}$ |
| $I \leftarrow I + [x_i]$ | Append $x_i$ to output list |
| $h \leftarrow \mathrm{Perm}(h, \theta_i^m)$ | Permute dual channels w. $\theta_i^m$ |
| $f \leftarrow \mathrm{Perm}(f, \theta_i^m)$ | Permute primal channels w. $\theta_i^m$ |
| end for | |
| return I | |
| end procedure | |

In the above algorithm, and throughout the present disclosure, y is the log-transformed and scaled projection data, $\mathcal{P}$ is the normalized projection operator, $\mathcal{P}^*$ is the normalized backprojection operator, θ is a parameter vector comprising preset parameters of the algorithm, $$\Gamma_{\theta_i^d}$$

is a dual block, for example a learned operator such as a neural network, with parameters $$\theta_i^d,$$

and dependent on one or more of e.g. $p_{op}$, $d_1$, and y, $$\Lambda_{\theta_i^p}$$

is a primal block, for example a learned operator such as a neural network, with parameters $$\theta_i^d,$$

and dependent on one or more of e.g. $b_{op}$, $p_1$, $x_{i-1}$, LW, and V, and

V is an auxiliary single-channel image space tensor with the same dimensions as the reconstructed volume.

The parameters θ may comprise 4 parameter groups:

$$\{\theta_i^p\}_{i=1}^8$$

are the primal block parameters, $$\{\theta_i^d\}_{i=1}^8$$

are the dual block parameters, $$\{\theta_i^o\}_{i=1}^8$$

are the output convolution parameters, and $$\{\theta_i^m\}_{i=1}^8$$

are the permutation parameters.

Although the algorithm is shown for a number of 8 iterations, it will be understood that the algorithm may be applied for any number of iterations. The number of parameters in each group may be varied accordingly. In fact, the number of iterations may be another parameter included in the parameter vector θ.

Regarding notation, we write $[z_1, z_2, \ldots, z_k]^{\oplus}$ to denote the channel-wise concatenation of tensors $z_1, z_2, \ldots, z_k$ which are assumed to have the same spatial and batch dimensions. Similarly we write superscript ⊕ 8 (wherein 8 may be replaced by any natural number) to denote the channel-wise concatenation of 8 copies of the tensor of which it is the superscript.

Function Splt(z) splits tensor z with 2n channels into tensors $z_1$, $z_2$ which get the first n feature maps of z and the last n feature maps of z respectively. Function Perm $$(z, \theta_i^m)$$

permutes tensor z with n channels along the channel dimension with a permutation $$\theta_i^m \in Sym(n),$$

wherein Sym(n) denotes the set of permutation operations that can be performed on n symbols.

Certain embodiments involve 8 primal/dual iterations (8 primal and 8 dual blocks) with both primal and dual latent vectors having 8 channels. Backprojected data (with or without FBP filtering) may be used to initialize the reconstruction $x_0$. The initial primal vector may be defined by stacking 8 copies of $x_0$. The initial dual vector may be defined by stacking 8 copies of y. At the beginning of each iteration i=1, . . . , 8, we may split the primal and the dual latent vectors along the channel dimension. First we update the dual latent vector in Line 10 of Algorithm 1 using dual block $$\Gamma_{\theta_i^d}.$$

In a particular embodiment, that dual block $$\Gamma_{\theta_i^d}$$

may be comprised of 3 layers of 3×3×3 convolutions with 96, 96 and 4 filters respectively and leaky rectified linear unit (LeakyReLU) activation after the first and the second convolution layer.

In certain embodiments, to update the primal block, we compute the Landweber term in Line 12 of Algorithm 1, which may correspond to a backprojection of a difference between a projection of the preliminary reconstructed volume and the the log-transformed and scaled projection data. We update the primal latent vector in [Line 13 of Alg. 4.1] using primal block $$\Lambda_{\theta_i^p}.$$

In certain embodiments, primal block $$\Lambda_{\theta_i^p}$$

is a U-net with a single downsampling layer, with for example 3×3×3 valid convolutions with, for example, 96 filters in the first double-convolution block, 192 filters in the bottleneck and LeakyReLU activation after all but the last convolution layer. In certain embodiments, we use average pooling with 2×2×2 kernel in the encoder and nearest upsampling in the decoder layer.

Primal and the dual updates may be computed patch-wise, which is possible thanks to the locality of $$\Gamma_{\theta_i^d} \text{ and } \Lambda_{\theta_i^p},$$

during backward pass weight gradients obtained from patches are summed to obtain the global weight gradients. New primal and dual vectors are combined in [Lines 14-15]. Reconstruction $x_{i-1}$ is updated in Line 16, where Conv3d is a 1×1×1 convolution with parameters $$\theta_i^o,$$

and we append the new reconstruction $x_i$ to the output list in [Line 17]. Finally, we permute the channels of both primal and dual latent vectors using the same permutation $$\theta_i^m$$

in [Lines 18-19]. For every i, the permutation $$\theta_i^m$$

is some fixed permutation of [1,2, . . . , 8] which may be randomly initialized during model initialization and stored as a model parameter. For example, it may be set as a constraint that that $$\theta_i^m$$

mixes the first and the second half of [1,2, . . . , 8].

The algorithm may implemented as an extension of a machine learning library. Adjointness of the projection and backprojection operators can be tested by checking the definition of Hermitian adjoint $$\langle \mathcal{P}x, y \rangle = \langle x, \mathcal{P}^* y \rangle$$

for random positive test functions (=tensors) x, y.

A procedure to calculate a loss function is shown in Algorithm 2.

Algorithm 2: Loss calculation for LIRE

```
procedure LOSS(x,y,V_f,V_s)
    L_1 ←|| x − y ||V_f,1                L^1 loss in full FOV
```

-continued

Algorithm 2: Loss calculation for LIRE

```
03:     L₂ ←‖ x − y ‖v_s,1                     L¹ loss in part. FOV
04:     S₁ ← 1.0 − SSIM_{v_f}(x,y)             1-SSIM, full FOV
05:     S₂ ← 1.0 − SSIM_{v_s}(x,y)             1-SSIM, part. FOV
06:     return L₁ + a₁S₁ + a₂(L₂ + a₁S₂)
07:   end procedure
```

Herein, SSIM denotes a structural similarity index and FOV denotes field of view.

Moreover, an algorithm to implement a suitable training procedure is disclosed in Algorithm 3. The training according to algorithm 3 is supervised, and the training set (of e.g. CT volumes) is denoted by $\mathcal{D}_{train}$. We elaborate on the training procedure below.

Algorithm 3: Training of LIRE

```
01: procedure TRAIN(𝒟_train,N_iter)
02: set initial parameter settings θ
03: for j ← 1, ... ,N_iter do
04:    x ~ 𝒟_train                                   Sample train volume
05:    Δ ~ 𝒩(0,100) ∈ ℝ³                             Sample offset w.r.t. scan center
06:    δ ← x.spacing                                 Get spacing of volume x
07:    𝒫,𝒫* ← 𝒫_{Δ,δ},𝒫*_{Δ,δ}                        Define projector, backprojector
08:    𝒫̄,𝒫̄ ← 𝒫/‖𝒫‖,𝒫*/‖𝒫‖                            Normalize operators
09:    y ← Poisson(I₀ · e^{−𝒫(x)})                   Noisy projections
10:    ȳ ← −ln(y)/‖𝒫‖                                Normalized log-transform
11:    V_f ← FullFOV(𝒫)                              Compute full FOV
12:    V_p ← PartialFOV(𝒫)                           Compute partial FOV
13:    V_s ← V_p\V_f                                 Incomplete FOV mask
14:    I ← RECONSTRUCT(ȳ, 𝒫̄, 𝒫̄*,θ,V_f)               Reconstruct
15:    loss ← 0                                      Initialize loss tensor
16:    for z ← I[1], ... ,I[8] do                    Loop over iterates
17:       loss ← loss + LOSS(x,z,V_f,V_s)            Increment loss
18:    end for
19:    compute gradients of loss w.r.t. θ
20:    update θ
21: end for
22: end procedure
```

In the above algorithm, and throughout the present disclosure, $\mathcal{D}_{train}$ is the training dataset, and $N_{iter}$ is the number of iterations.

In a certain embodiment of the training procedure, a CT volume is repeatedly sampled from the training dataset in Line 4 of Algorithm 3. During the sampling, augmentations that flip patient left-right and top-bottom are randomly applied, both with probability 50%. We sample a random offset for the rotation center with respect to the center of the CT volume from an isotropic Gaussian distribution with 0 mean and a standard deviation of 100 mm in Line 10. Choosing a random offset can be viewed as an additional type of augmentation, furthermore, in practice the isocenter in radiotherapy will be located close to a tumor. These augmentations are merely presented as examples. The training method is not limited by these augmentations of the training data.

We define projection $\mathcal{D}$ and backprojection $\mathcal{D}^*$ operators for the CBCT projection geometry with given volume spacing and center offset in Line 7 of Algorithm 3, and in Line 8 of Algorithm 3 we compute normalized versions of these operators. The operator norm may be estimated numerically using, for example, a power method with, for example, three iterations. Such a power method is known by itself from e.g. Boyd, D. W., 1974, The power method for lp norms, Linear Algebra and its Applications 9, 95-101.

Synthetic noisy projection data is computed in Line 9 of Algorithm 3 (see Equation 2) to model the noisy CBCT data acquisition process. This noisy projection data is log-transformed and scaled in Line 10 of Algorithm 3. In general, for a realistic CBCT geometry the field of view does not necessarily contain the scanned object completely. When comparing reconstruction metrics it may also be important to compute these metrics inside an appropriately defined field of view only, since having a large part of the volume set to 0 outside the corresponding field of view would yield over-optimistic reconstruction metrics. We define the full field of view tensor $V_f$ and the partial field of view tensor $V_p$ in Lines 11 and 12 of Algorithm 3 respectively, both of these are scalar tensors having same dimensions as the volume that we want to reconstruct. For the projection geometry with small FOV setting, the full field of view tensor is constructed as $$V_f(p) = \begin{cases} 1 & p \text{ is seen from all projection angles} \\ 0 & \text{otherwise,} \end{cases}$$

while for the projection geometry with large FOV setting the full field of view tensor is constructed as $$V_f(p) = \begin{cases} 1 & p \text{ is seen from all projection angles} \\ 0.5 & p \text{ is seen from half of the projection angles} \\ 0 & \text{otherwise.} \end{cases}$$

It will be understood that in alternative embodiments, the full field of view tensor $V_f$ could be any monotonic function in the number of projection angles from which a pixel p is seen. We chose to use different values (1.0 and 0.5) above to mark the voxels seen from all the projection angles and the voxels which are seen from only half of the angles, however, we expect that the exact numerical values used in these masks are not important. For both small and large field of view settings, the partial field of view is defined as $$V_p(p) = \begin{cases} 1 & p \text{ is seen from at least one angle} \\ 0 & \text{otherwise.} \end{cases}$$

In particular, this definition of $V_p$ implies that in the central axial plane all voxels are marked as 'partially visible'. It will be understood that in alternative embodiments, the full field of view tensor $V_p$ could be any monotonic function in the number of projection angles from which a pixel p is seen, wherein preferably $V_p(p) \geq V_f(p)$.

In Line 13 of Algorithm 3, we define $V_s$ as the tensor which equals 1 on the set of all voxels p s.t. $V_p(p)>0,2$ $V_f(p)=0$ and zero elsewhere. In Line 14 of Algorithm 3, we call the main reconstruction procedure (e.g. procedure RECONSTRUCT of Algorithm 1), providing log-transformed normalized projection data, normalized versions of projection and backprojection operators, the collection of weights θ and the auxiliary tensor $V_f \cdot V_f$ helps the network to deal with the non-homogeneouos nature of the reconstruction artifacts.

The reconstruction algorithm returns a list $I=[z_1, z_2, \ldots, z_8]$ of reconstructions, which are obtained after performing 1,2, . . . , 8 reconstruction steps respectively. We sum the reconstruction losses over all $z \in I$ in Line 17 of Algorithm 3. Loss computation may be performed using e.g. the procedure Loss of Algorithm 2. We may sum losses over the full field of view region, where $V_f>0$, and the partial field of view region, where $V_s 0$. We compute the loss for partial field of view to ensure that the network can provide at least an approximate reconstruction in this region. As shown in Algorithm 2, a linear combination of $L^1$ loss and Structural Similarity Loss may be computed for both regions to calculate the loss function. For example, we used $\alpha_1=0.1$ for both field of view settings. $\alpha_2$ was set to 0.1 initially and then reduced to 0.01 after first learning rate decay step.

FIG. 1 shows a block diagram of a system 100 for reconstructing an image using a learned invertible operator. The system 100 can, in addition, be configured to train the learned invertible operator. The system 100 may be a computer, for example, or a computing unit of a cone-beam CT apparatus. The system 100 may alternatively be implemented as a server, such as a cloud server or a server operating on a local area network. The system 100 comprises a processor unit 101 that may comprise one or more computer processors, such as central processing units, CPU's, and/or graphical computing units, GPU's. It will be understood that certain calculations may be implemented most efficiently using GPU's. The system 100 further comprises a memory 102. The memory 102 may comprise volatile memory and/or non-volatile memory, such as random access memory, magnetic disk, flash memory, or any other type of memory. The memory 102 may store program code 102' in form of instructions for the processor unit 101. The algorithms disclosed in the present disclosure may be implemented at least partially in form of such program code. The memory 102 may further store data 102". Such data 102" may include, but is not limited to, measured projection data, reconstructed image data, intermediate reconstruction results, model parameters. When the system 100 is configured for training, the data 102" may further include training data and/or testing data.

The system may further comprise a communications unit 103. The communications unit 103 may comprise any type of communication bus, such as universal serial bus (USB), or any type of wired or wireless connection interface. By means of the communications unit 103, the system 100 may communicate with external sources of images, such as an imaging apparatus 150. Imaging apparatus 150 may be a CBCT scanner or another type of scanner, such as an MRI scanner or a helical-type CT scanner, for example. The communications unit 103 may further be configured to communicate with a user input/output interface 151, such as an output device such as a display, and/or an input device such as a keyboard, mouse, or touch screen. The input/output interface 151 may be used to control the system 100. Alternatively, the system may be controlled by any suitable computer system, including the system 100 itself.

Figure 2:
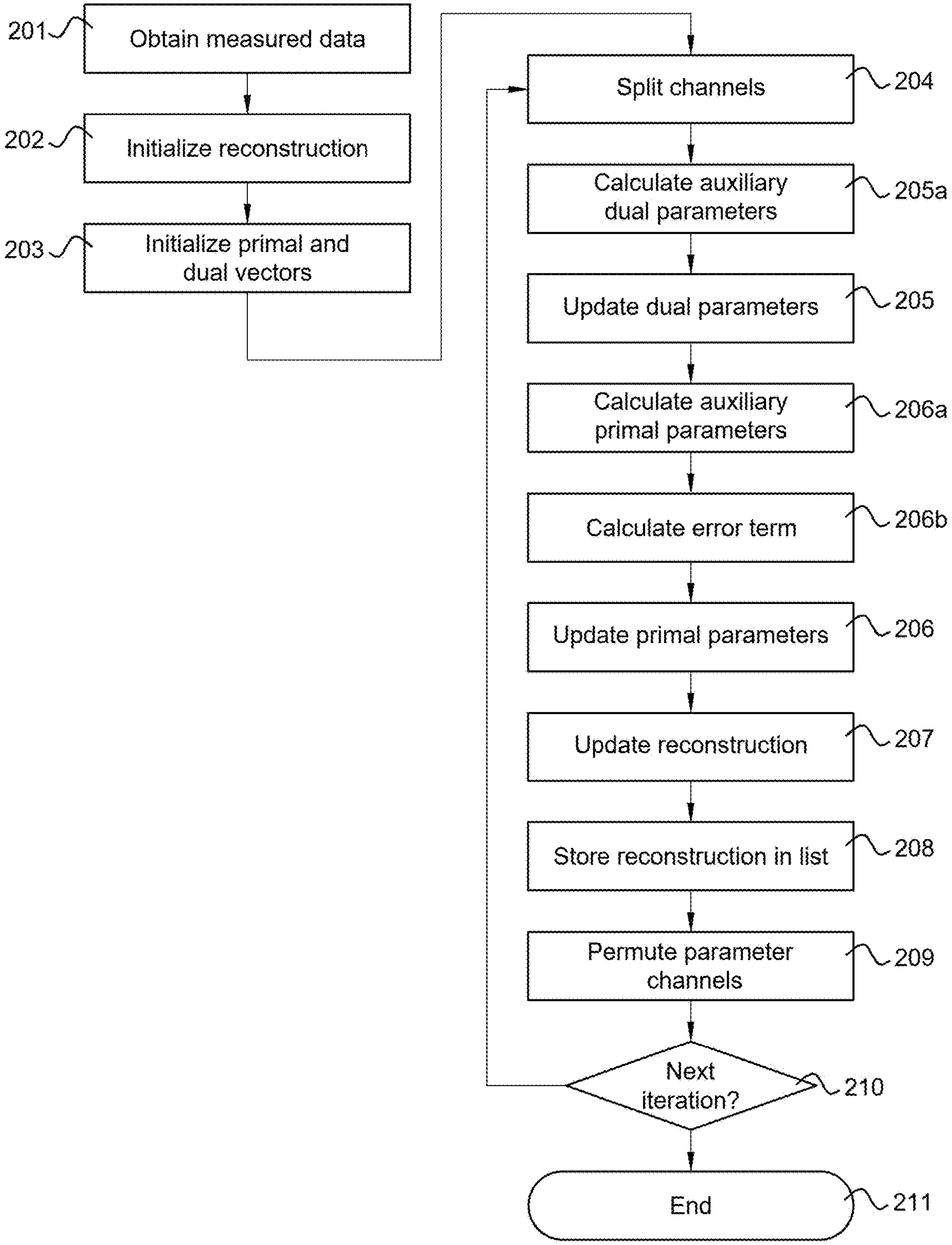
FIG. 2 shows a flowchart of a method of reconstructing an image using a learned invertible operator.

FIG. 2 shows a block diagram of a method of reconstructing an image using a learned invertible operator. As a preliminary step (not illustrated) a number of algorithmic parameters are determined, such as parameters of learned models and other algorithm parameters such as a number of channels to be used for storing intermediate results and a number of iterations to perform, what permutations to perform on the channels, and so on.

The method starts in step 201 by obtaining measurement data y. In certain embodiments, in particular when used to train the reconstruction algorithm, the measurement data could be generated artificially. However, in daily practice when reconstructing an image, the measurement data may be data obtained from an acquisition apparatus 150 including a plurality of sensors. The data may be pre-processed, for example smoothed or outliers may be removed, for example. The measurement data is generally defined in a dual space, for example a space consisting of a plurality of projections of a primal space.

In the subsequent steps, a number of variables are initialized. For example, in step 202, an image may be generated by back-projecting the measurement data. For example, a normalized backprojection may be employed. For example, the back-projection may be unfiltered or filtered only to a limited extent. Alternative classical reconstruction methods, e.g., iterative reconstruction with total variation (TV) regularization, can be used for the initial reconstruction as well. This step helps to improve the computational efficiency and may also provide better capability of the learned models to perform corrections. A list of intermediate reconstructions may be created, this list may be extended during the procedure by adding newly created reconstructions to the list. In general, the image is defined in a primal space. The primal space may for example correspond to a volume in the real world.

In step 203, the primal vector and/or the dual vector may be initialized. The primal vector, consisting of primal parameters defined in the primal space, may comprise a number of components called channels. Each channel may comprise data of an image in the primal space. Thus, each pixel or voxel of the primal space may be represented by a pixel in each primal channel. Initially, each channel may be initialized to be equal to the initial back-projected image. So, initially the primal vector may contain a number of copies of the initial back-projected image. However, this is not a limitation. In alternative embodiments, for example, one or more or each copy may be perturbed a bit using a random noise, for example. Yet alternatively, the primal parameters could be initialized to zero.

Moreover, the dual vector, comprising dual parameters defined in the dual space, may be divided up into a number of components called channels. Each channel of the dual vector may comprise data in the dual space. For example, each pixel of a projection may be represented by a pixel (parameter) in each dual channel. Initially, each channel may be initialized to be equal to the measured data. So, initially the dual vector may contain a number of copies of the measured data. However, this is not a limitation. In alternative embodiments, for example, one or more or each copy may be perturbed a bit using a random noise, for example, or filtered, for instance, similarly to the filtering in FBP reconstruction method.

Preferably the number of channels in both the dual vector and the primal vector is an even number. For example that number is 8 channels. Also, the number of channels of the dual vector may be equal to the number of channels of the primal vector, however in certain embodiments it may also be a different number of channels.

In the iteration phase of the learned iterative reconstruction, the following operations may be performed.

In step 204, the channels may be split into a first subset of channels and a second subset of channels. That is, the dual channels may be split into a set of first dual channels containing first dual parameters and a set of second dual channels containing second dual parameters. Similarly, the primal channels may be split into a set of first primal channels containing first primal parameters and a set of second primal channels containing second primal parameters.

In step 205, the dual parameters may be updated. In certain embodiments, only the second dual parameters are changed in the update, while the first dual parameters are kept unchanged. For example, the dual parameters, in particular the second dual parameters, may be updated based on at least one of: the first dual parameters, the measured data, forward projected primal parameters (e.g. forward projected second primal parameters), and the forward projection of the latest updated reconstruction image. The second dual parameters may be updated, for example, by adding the output of a neural network or another learned model to the second dual parameters.

In certain embodiments, the updating of the dual parameters is performed using a model (e.g. a learned model) that is dependent on further calculated parameters, called auxiliary dual parameters herein. Therefore, in step 205*a*, these auxiliary dual parameters may be calculated before updating the dual parameters. For example, the auxiliary dual parameters may include one or more forward-projected channels of the primal parameters (e.g. the forward-projection of the second primal channels) and/or the forward-projected latest updated reconstruction.

In step 206, the primal parameters may be updated. In certain embodiments, only the second primal parameters are changed in the update, while the first primal parameters are kept unchanged. For example, the primal parameters, in particular the second primal parameters, may be updated based on at least one of: the first primal parameters, the latest updated reconstruction image, an error term, a mask (V), and back-projected dual parameters, in particular the back-projected first dual parameters. The second primal parameters may be updated, for example, by adding the output of a neural network to the second primal parameters.

The error term, used in step 206, may be calculated in step 206*b* before updating the primal parameters in step 206. For example, the error term may be for example a Landweber term or a gradient of another error function or loss function with respect to the reconstruction tensor (i.e. the latest updated reconstruction image). Preferably, a gradient of data likelihood or log-likelihood computed based on the latest reconstructed image in the primal space and the measured data in the dual space.

In certain embodiments, the updating of the primal parameters is performed using a model (e.g. a learned model) that is dependent on further calculated parameters, called auxiliary primal parameters herein. Therefore, in step 206*a*, these auxiliary primal parameters may be calculated before updating the primal parameters. For example, the auxiliary primal parameters may include one or more back-projected channels of the dual parameters (e.g. the back-projection of the second dual channels).

In step 207, the reconstructed volume may be updated based on the primal parameters. In certain embodiments, both the first primal parameters and the second primal parameters contribute to the update of the reconstructed volume. For example, all the primal parameters that relate to a particular pixel may be combined (e.g. averaged with certain, potentially learnable, weights), and that particular pixel of the reconstructed volume may be updated based on the combined value. For example, this may be achieved by a 1×1×1 convolution filter applied to the primal parameters.

In step 208, the updated reconstruction is stored in a list. The list of reconstructions may contain all the reconstructions that are generated, one reconstruction for each iteration.

Alternatively, e.g. when performing the reconstruction without an aim to train the learned operator, only the latest updated reconstruction is stored.

In step 209, the channels may be permuted. The dual channels (which may be numbered 1 through N, wherein N is the number of dual channels) may be reordered according to a predetermined permutation. This permutation can be randomly determined. The permutation can be different for each iteration. However, preferably the permutation used in each iteration is set beforehand, that is: before training the learned operators; for instance, randomly chosen from the set of permutations that mix first and second half of the channels. Therefore, the permutations may be part of the system parameters 0.

Similarly, the primal channels (which may be numbered 1 through M, wherein M is the number of primal channels) may be reordered according to a predetermined permutation. This permutation can be randomly determined. The permutation can be different for each iteration. However, preferably the permutation used in each iteration is set beforehand, that is: before training the learned operators; for instance, randomly chosen from the set of permutations that mix first and second half of the channels. Therefore, the permutations may be part of the system parameters 0. In certain embodiments, where the number of primal channels equals the number of dual channels, the permutation of primal channels may be set equal to the permutation of dual channels for every time step.

The steps 204-209 may be repeated a number of times. Therefore, in step 210 it may be determined whether another iteration is to be performed. For example, the number of iterations may be determined before or during algorithm training (e.g. 8 times), based on the desired inference speed and the image quality metrics on the validation set. Alternatively, for example if the primal/dual blocks are sharing the set of parameters starting from a certain iteration onwards, the iterations may continue until a data consistency error is below a certain threshold, or when the data consistency error does not decrease more than a certain threshold, from one iteration to the next iteration. In such a case, still a maximum number of iterations may be set. For example, the data consistency error can be calculated based on the reconstruction and the measured data. After the last iteration the process ends in step 211 and may return the reconstruction that was stored in the last iteration, for example, or the reconstruction associated with the smallest data consistency error may be returned. During training, a list containing all reconstructions may also be returned.

Figure 3:
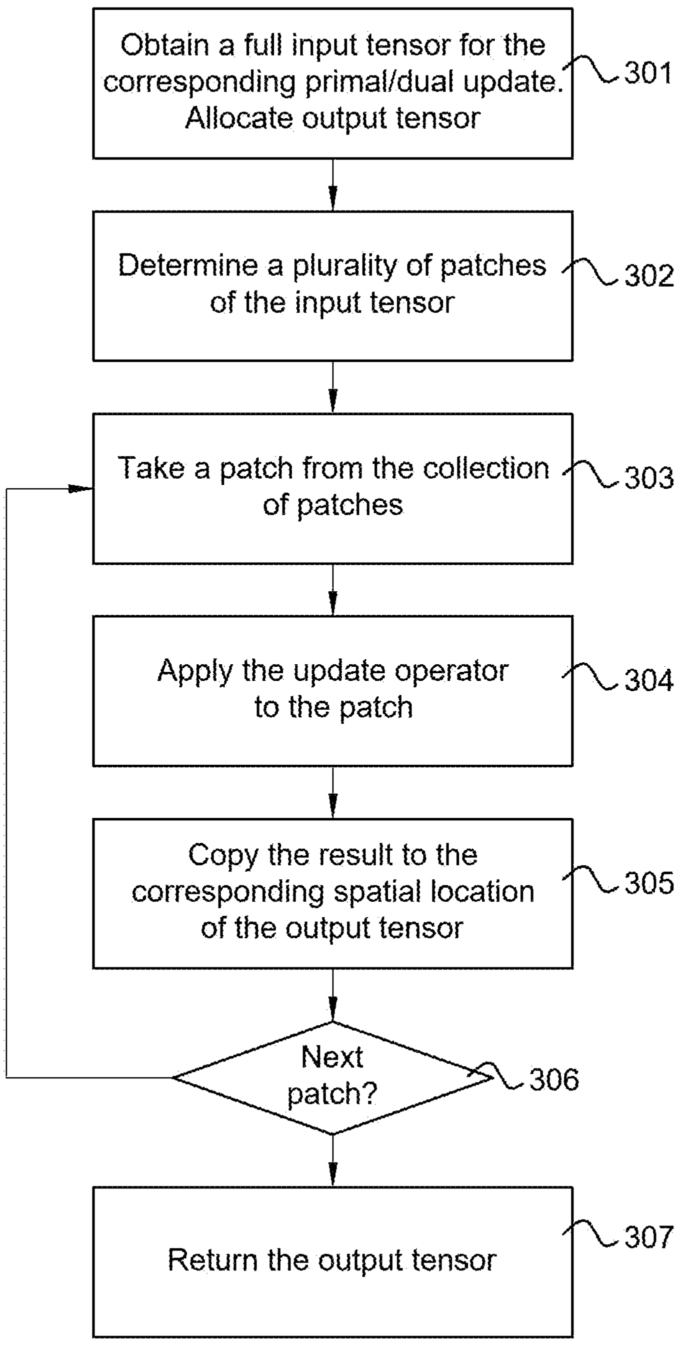
FIG. 3 shows a flowchart of a method of patch-wise reconstruction.

FIG. 3 shows a flowchart of a method of patch-wise computation, which can be used for computing each primal/dual update in steps 205 and 206 (Lines 10 and 13 of Algorithm 1). The patch-wise computation can also be used in step 405 (Line 19 of Algorithm 3), to calculate the backward pass (for gradient computation during training).

The method starts in step 301 with obtaining a full input tensor for the a particular primal or dual update operation and allocating the output tensor. The input tensor may correspond, for example, to the inputs provided to a primal block or a dual block. In the backwards pass of gradient computation, the inputs may correspond to either the output of the primal or the dual update operation obtained during the forward pass, at which point this output tensor may be used to re-compute the original input tensor patch-by-patch, or the restored input tensor, which may be subsequently used for gradient computation via backpropagation restricted to the specific patch.

In step 302, a plurality of patches is identified. For example, the input tensor is broken up into small regions, such as rectangular blocks, along all three axes, corresponding to the spatial dimensions for primal update and to the two detector dimensions plus the projection dimension for the dual update. In certain embodiments, these patches include additional overlapping boundary regions to allow for e.g. valid convolutions.

In step 304, for one patch of the input tensor, the update operator is applied to the input patch. The update operator returns an output patch, which may have smaller dimensions than the input patch if valid convolutions are employed.

In step 305, the data from the output patch is copied into the corresponding region of the output tensor.

In step 306, it is determined if all patches have been processed. If not, the steps 304 and 305 are repeated. If all patches have been processed, in step 307 the resulting output tensor (gather from local patch-by-patch updates) is returned. In the backwards pass of gradient computation, gradients of the network coefficients obtained from back-propagation restricted to different patches are combined via summation.

Figure 4:
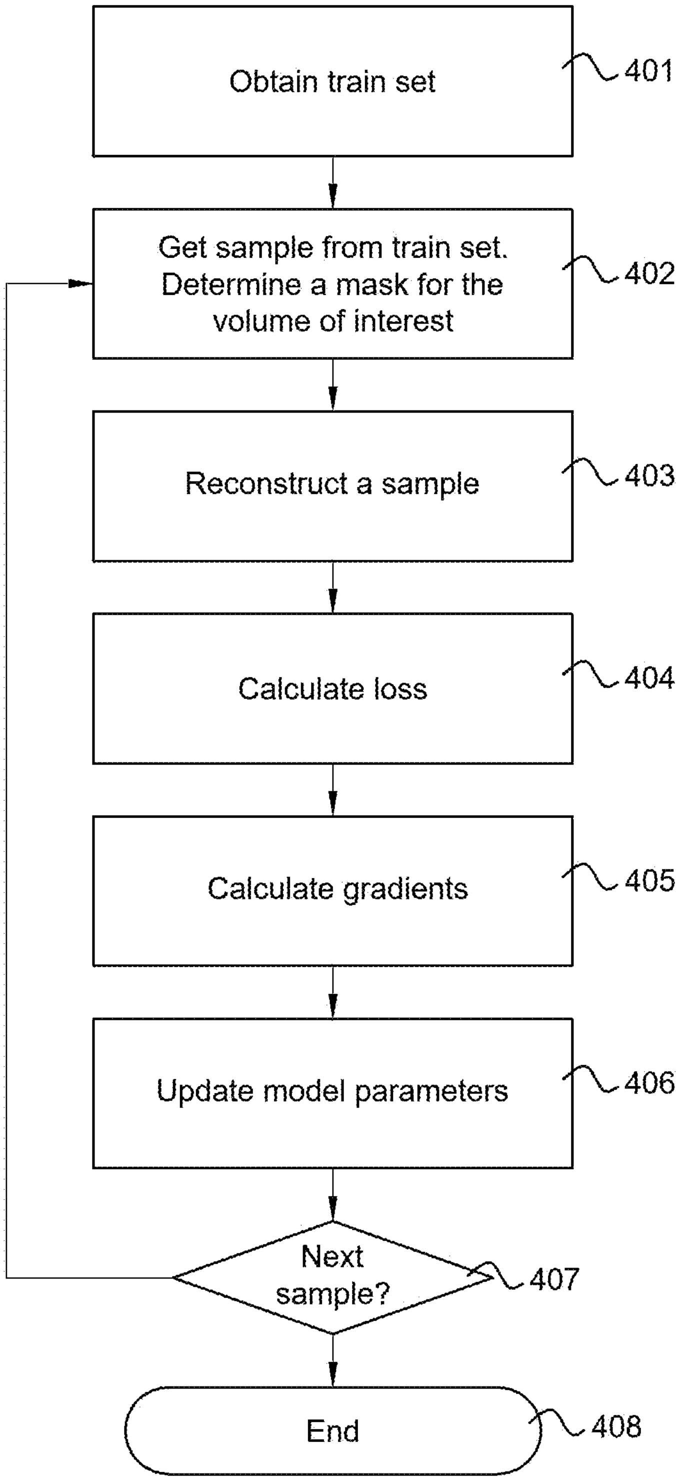
FIG. 4 shows a flowchart of a method for training a learned invertible operator.
Figure 6A:
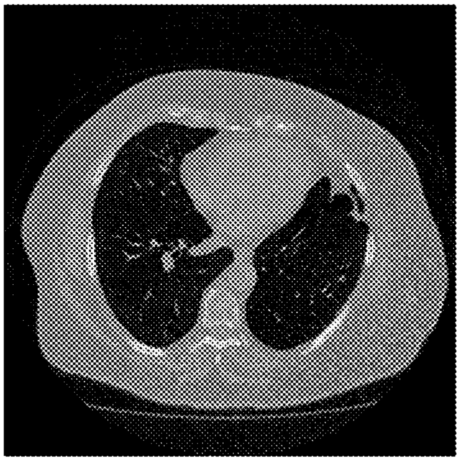
FIG. 6 shows thorax CT axial slices for small FOV.
Figure 6B:
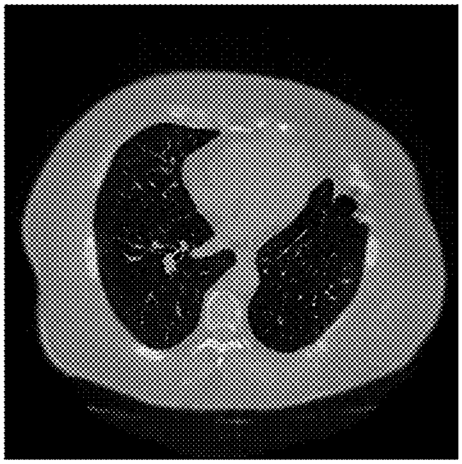
Figure 6C:
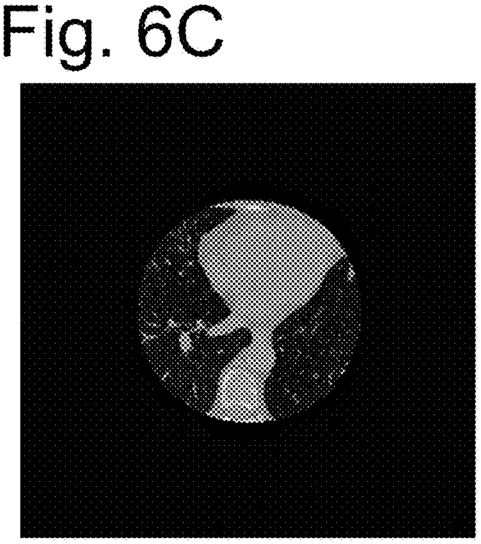
Figure 6D:
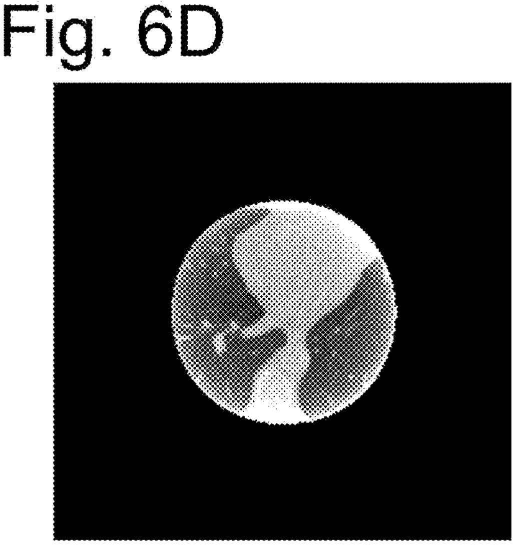
Figure 6E:
Figure 7A:
FIG. 7 shows thorax CT coronal slices for small FOV.
Figure 7B:
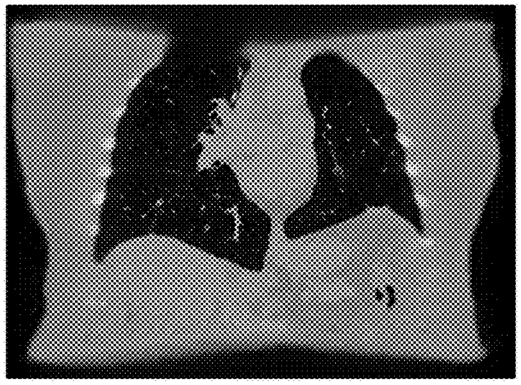
Figure 7C:
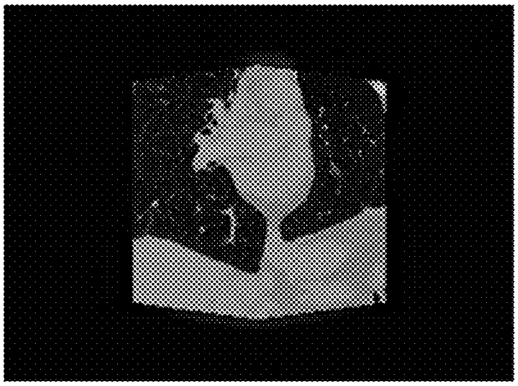
Figure 7D:
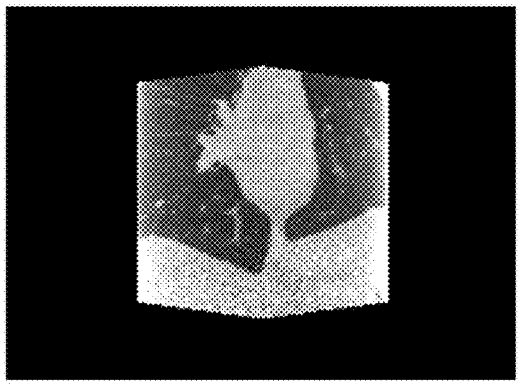
Figure 7E:
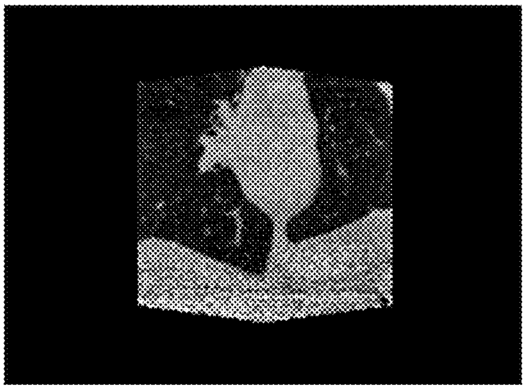
Figure 8A:
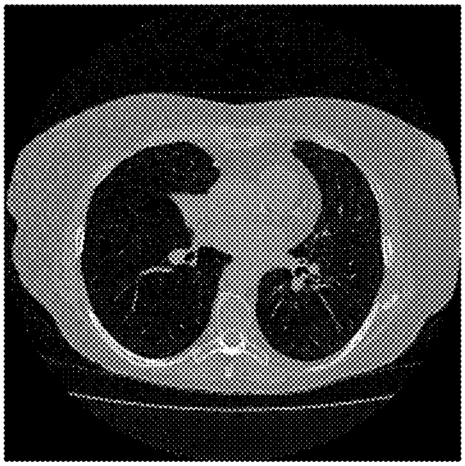
FIG. 8 shows thorax CT axial slices for large FOV.
Figure 8B:
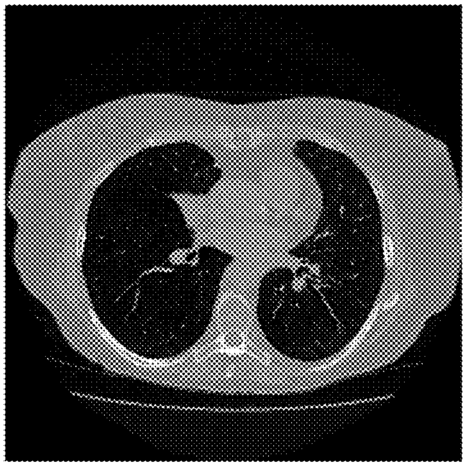
Figure 8C:
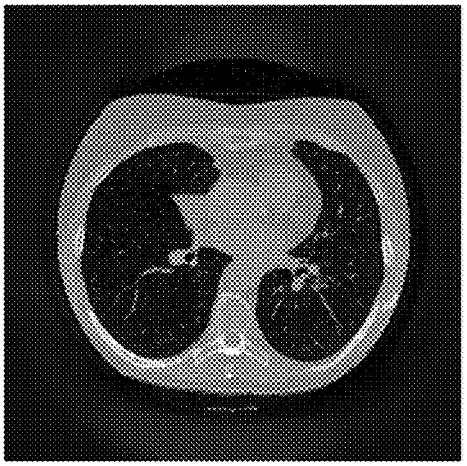
Figure 8D:
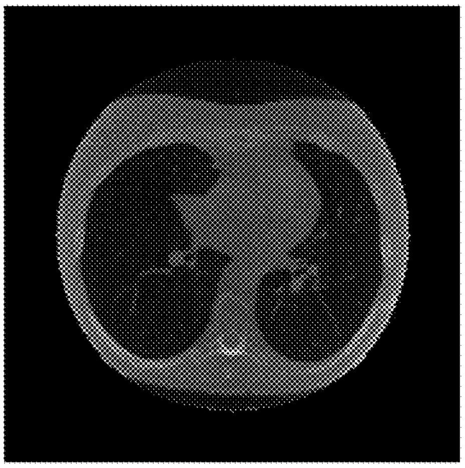
Figure 8E:
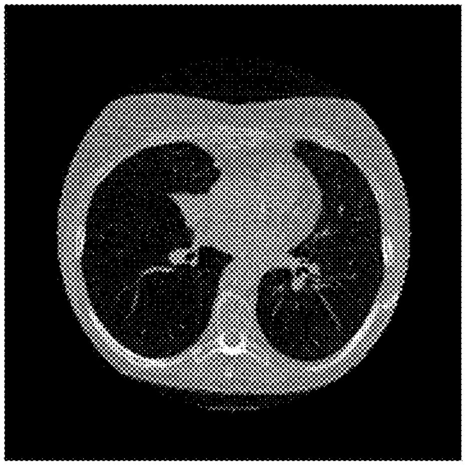
Figure 9A:
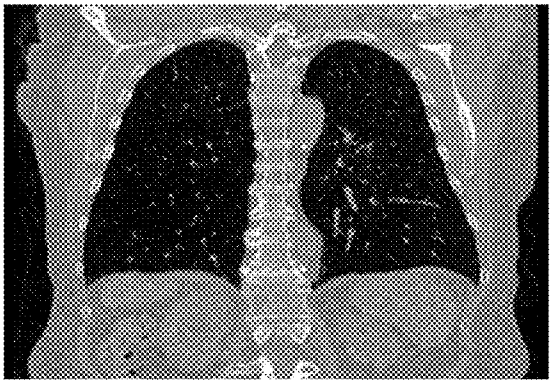
FIG. 9 shows thorax CT coronal slices for large FOV.
Figure 9B:
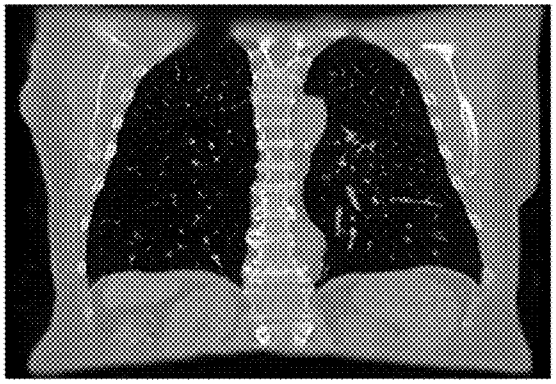
Figure 9C:
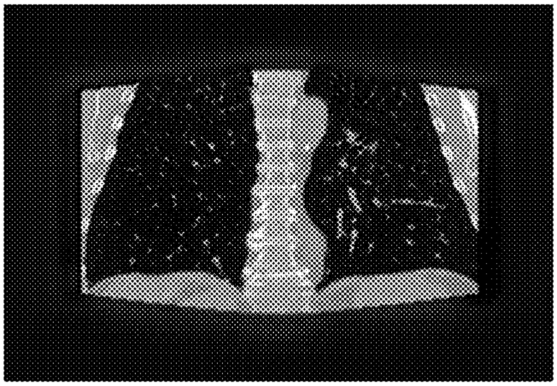
Figure 9D:
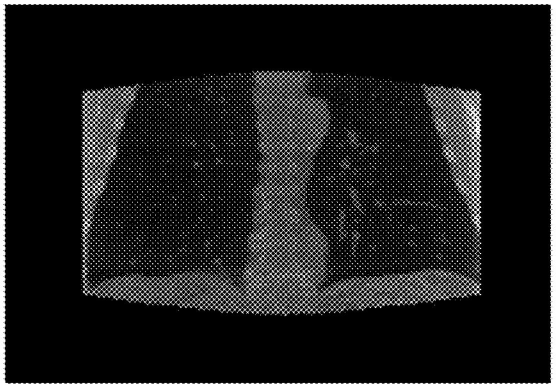
Figure 9E:
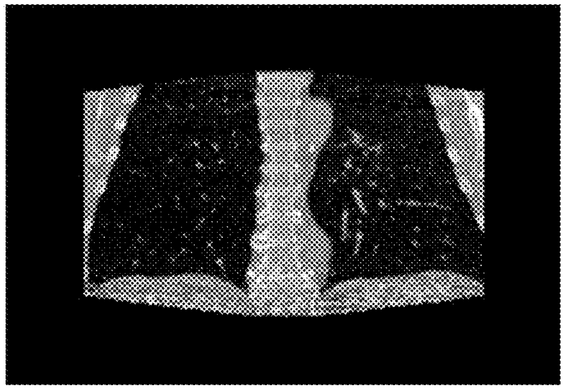
Figure 10A:
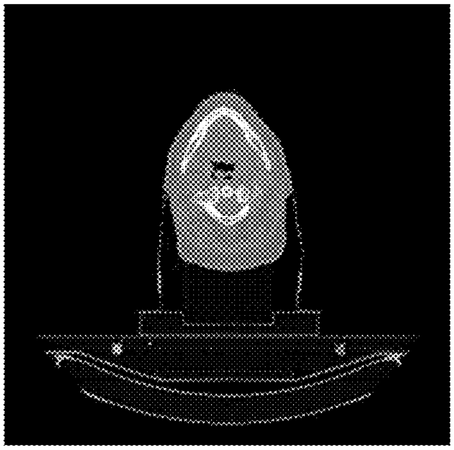
FIG. 10 shows head & neck CT axial slices for large FOV.
Figure 10B:
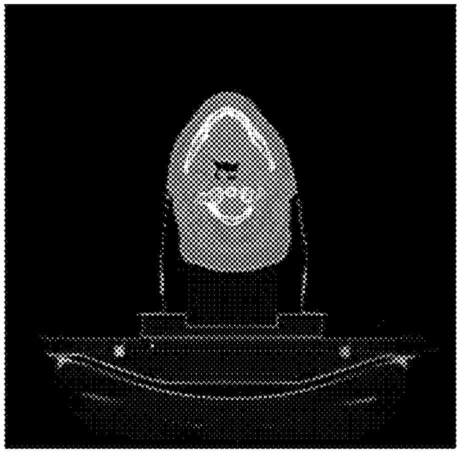
Figure 10C:
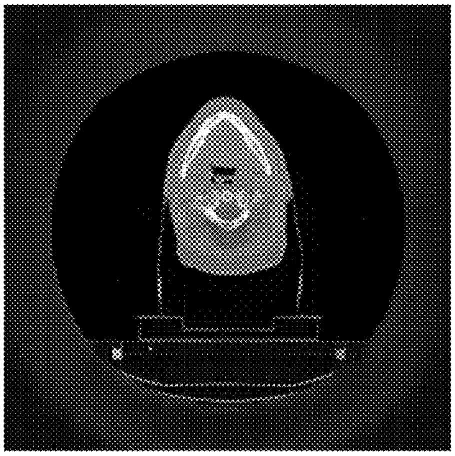
Figure 10D:
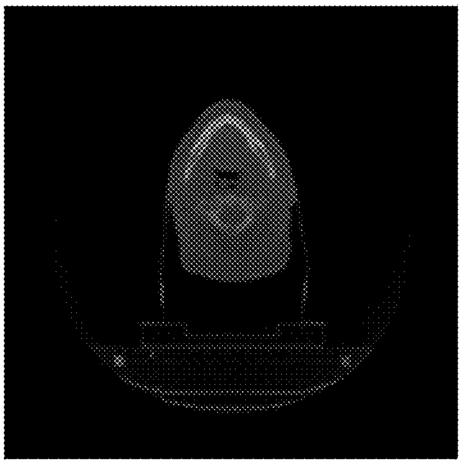
Figure 10E:
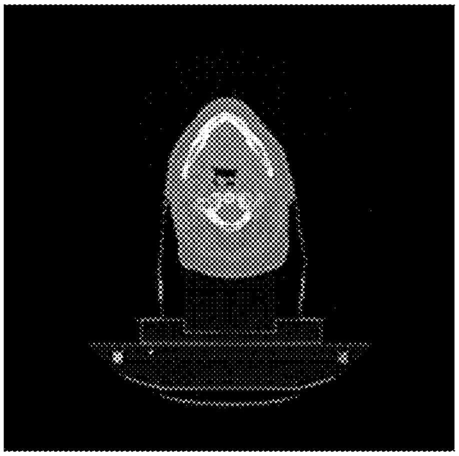
Figure 11A:
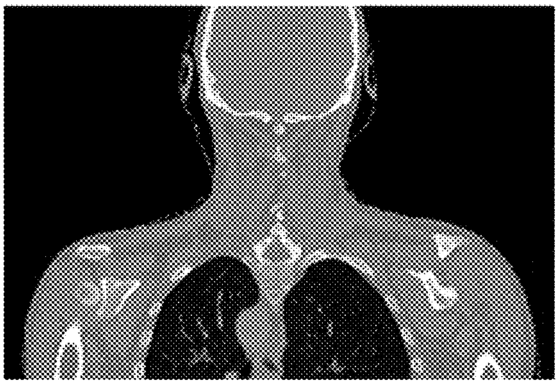
FIG. 11 shows head & neck CT coronal slices for large FOV.
Figure 11B:
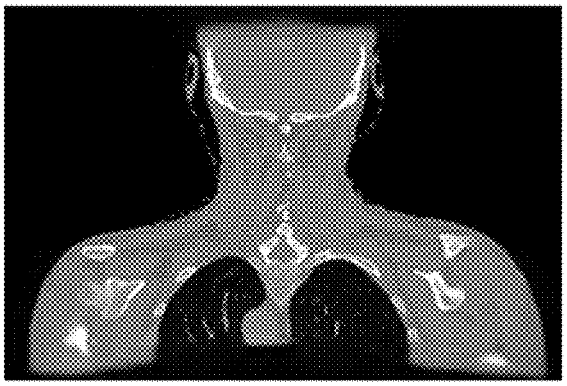
Figure 11C:
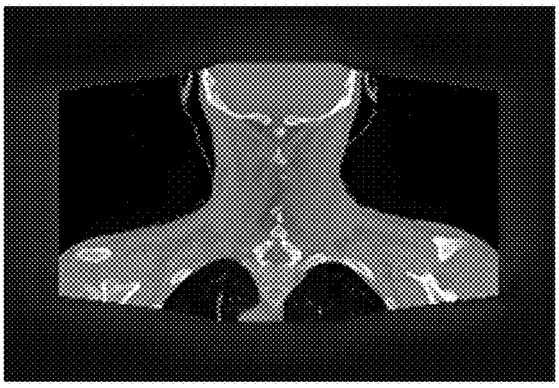
Figure 11D:
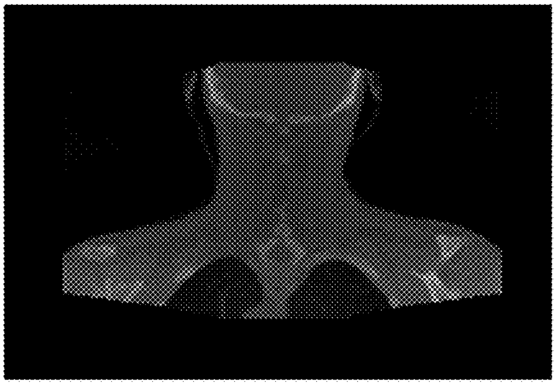
Figure 11E:

FIG. 4 shows a flowchart of a method for training a learned invertible operator. The method starts at step 401 of obtaining a train set. The train set may comprise sets of acquired data and the gold standard reconstruction for each set of acquired data. Also, the train set can contain processed samples of artificially generated acquired data, together with the gold standard reconstruction and/or digital phantoms that were used to generate the acquired data. Such digital phantoms might be based on reconstructions of acquired data for a related imaging modality, such as CT volumes being used to train a CBCT reconstruction algorithm, might be purely procedurally generated, or might involve a combination of both approaches. Artificial processing steps can include adding noise and/or applying operations such as rotations, mirroring or other deformations to existing acquired samples.

In step 402, an element is sampled from the train set and a mask of the volume of interest is computed, determining the region in which reconstruction loss may be optimized.

Preferably, a mask is generated that indicates the voxels that have been covered by all projections and/or the voxels that have been covered by at least one, but not all projections. Such mask may also contain information about the number of projections in which the corresponding spatial location is visible, and may serve as additional input to the reconstruction algorithm.

In step 403, a reconstruction is performed for the measured data of a sample in the train set. This reconstruction may be done using one of the methods disclosed herein, for example the method described with reference to FIG. 2 or FIG. 3.

In step 404, the loss function may be calculated, e.g. a loss tensor, as described in greater detail elsewhere in this disclosure. The loss function provides an indication of the error of the reconstruction. In preferred embodiments, wherein the reconstruction is an iterative reconstruction, the intermediate reconstructions of the iterations are also taken into account in the loss function.

In step 405, the gradients of the loss function are calculated as a function of the model parameters (e.g. the coefficients of the neural networks used as the dual-space learned model and/or the primal-space learned model).

In step 406, the model parameters are adjusted based on the calculated gradients.

In step 407, it is decided if training should be continued using more samples. If yes, the process proceeds from step 403 with the next sample of measured data from the train set. Otherwise, the calculated model parameters are consolidated for future reconstructions and the process ends in step 408.

To compute the gradients of the reconstruction loss with respect to the coefficients of the network, in e.g. step 405 and Algorithm 3, Line 19, the last value of primal/dual parameters computed by the algorithm during the forward pass (i.e., the primal vector $f$ and the dual vector g after completing Algorithm 1, Line 21) and the list of reconstructions returned by the algorithm may be used in addition to the input data. During the gradient computation, for each tensor in the list of reconstructions the corresponding gradient tensor of the reconstruction loss is provided, e.g., by the deep learning API with automatic differentiation functionality.

The process of computing the gradients for the neural network coefficients involves reversing the forward pass and using invertibility of the architecture to re-compute previous values of primal/dual parameters ($f$ and g in Algorithm 1) starting from the last values obtained during the forward pass. The restored primal/dual parameters can then be used to re-compute intermediate activations inside the primal/dual blocks (one block at a time) which are necessary for the gradient computations for network coefficients via back-propagation. Apart from the memory optimizations, our gradient computation procedure may be mathematically equivalent to the standard backpropagation and may yield identical gradients. To exemplify in the particular setting of Algorithm 1, we first reverse the primal/dual channel permutations together with the corresponding gradient data in Lines 18 and 19. For i=8 we take the gradient of the primal/dual vectors to be zero, while for i=7,6, . . . , 1 the corresponding gradients are computed in the preceding step i+1. The last reconstruction update $$x_8 \leftarrow x_7 + Conv3d(f, \theta_8^2)$$

in Line 16 provides gradients to the network coefficients $$\theta_8^2$$

as well as additional gradients for the primal vector $f$ and $x_7$. The primal vector $f$ together with the gradient data is split into $p_1$, $p_2$ and the dual vector d together with the gradient data is split into $d_1$, $d_2$, reversing the concatenation performed in Lines 14, 15. To compute the gradients for the coefficients $$\theta_8^p$$

in the primal update operation $$p_2 \leftarrow p_2 + \Lambda_{\theta_8^p}([b_{op}, p_1, x_7, LW, V]^{\oplus})$$

in Line 13, it is sufficient to know the gradient for $p_2$ and the input tensor $[b_{op}, p_1, x_7, LW, V]^{\oplus}$. This input tensor is provided to the primal update block $$\Lambda_{\theta_8^p}$$

patch-by-patch, the intermediate activations are re-computed separately for each patch and the gradient computation is performed via standard backpropagation separately on each patch by taking the corresponding patch of the gradient tensor for $p_2$ for each patch of the input tensor. The gradients of the coefficients $$\theta_8^p$$

are aggregated via summation of the coefficient gradients computed on patches. For the input tensor gradient, we first allocate a zero tensor having the same shape as the input tensor $[b_{op}, p_1, x_7, LW, V]^{\oplus}$to store this gradient, and subsequently, for each patch of the input tensor, add the resulting input gradients to the corresponding spatial region of this zero-initialized gradient tensor. As a result, this yields gradients to the coefficients $$\theta_8^p$$

and the tensors $b_{op}$, LW, as well as additional gradients to the tensors $p_1$,$x_7$. Furthermore, knowing $$\Lambda_{\theta_8^p}([b_{op}, p_1, x_7, LW, V]^{\oplus})$$

and the last value of $p_2$ allows to restore the original value of $p_2$ in Line 13 patch-by-patch and erase the latest value of $p_2$ from the memory. After that, Lines 11-12 contain differentiable operations, and provide gradients to $d_2$ as well as additional gradient for $x_7$. To compute the gradients for the coefficients $$\theta_8^d$$

in the dual update operation $$d_2 \leftarrow d_2 + \Gamma_{\theta_8^d}([p_{op}, d_1, y]^{\oplus})$$

in Line 10, it suffices to know the gradient for $d_2$ and the input tensor $[p_{op}, d_1, y]^{\oplus}$. The gradient computation is performed similarly to the primal update, this provides gradients to the coefficients $$\theta_8^d$$

and the tensors $p_{op}$ as well as additional gradient for $d_1$. Furthermore, this allows to restore the original value of $d_2$ in Line 10 and erase the latest value of $d_2$ from the memory. Line 9 contains differentiable operation, and provides additional gradient to $x_7$ as well as gradient for the "restored" $p_2$. The parts $p_1$, $p_2$ and $d_1$, $d_2$ together with the corresponding gradients are combined back into primal and dual vectors together with the corresponding gradients, reversing the split in Lines 7 and 8. After this, the gradient computation proceeds similarly for i=7,6, . . . , 1.

FIGS. 5-11 show evaluation results.

FIG. 5 shows a table with test results on thorax CT and head & neck CT, for both a small field of view and a large field of view. The best result for each dataset has been indicated in boldface.

In the evaluation, we trained two versions of the learned iterative reconstruction (LIRE) model, one for the small FOV setting and one for the large FOV setting. The model was trained to reconstruct complete volumes. For the internal patch-based computations inside LIRE we set the patch size to 128×128×128, resulting in roughly 30 GB VRAM usage per single volume. Reducing the patch size to 32×32×32 decreased the usage to roughly 20 GB VRAM per single volume. Eight 48 GB GPUs were used for training LIRE in distributed data parallel mode. We used Adam optimizer [Kingma and Ba (2014)] with an initial learning rate of 0.0001 and a plateau scheduler with linear warm-up and 10 epoch patience. Adam optimizer is known, by itself, from Kingma, D. P., Ba, J., 2014, Adam: A Method for Stochastic Optimization, arXiv e-prints, arXiv:1412.6980.

At the end of each epoch models were evaluated, the best model was picked for testing. Training was stopped when we did not observe improvement for more than 15 epochs. LIRE evaluation was performed in the full field of view region, where $V_f>0$, using PSNR and SSIM metrics.

During the inference, it took LIRE approximately 104 seconds to reconstruct a single volume on a single GPU for the small FOV setting and approximately 115 seconds to reconstruct a volume for the large FOV setting.

For the evaluation of LIRE, we simulated two common clinical acquisition geometries for a Linac-integrated CBCT scanner from Elekta: a small field-of-view setting and a medium field-of-view setting, which will refer to as 'small FOV setting' and 'large FOV setting'. For both settings, the source-isocenter distance is 1000 mm and the isocenter-detector plane distance is 536 mm. For the small FOV setting, the source-isocenter ray passes through the center of the detector, while for the large FOV setting the detector is offset by 115 mm to the side in the direction of rotation. Square detector panel with a side of 409.6 mm and 256×256 pixel array was used. The projection counts were 400 and 720 for the small FOV and the large FOV setting respectively. The source moves over a 200 degrees arc for the small FOV setting, and for the large FOV setting the source moves over a full circle.

To train and evaluate our models, we collected two diagnostic CT datasets from the institutional archive: a dataset of 424 thorax CT scans with isotropic spacing of 1 mm, and a dataset of 79 head & neck CT scans with anisotropic spacing of between 0.9 mm and 1.0 mm for axial plane and between 1.0 mm and 1.6 mm for the perpendicular direction. Both datasets had axial slice of 512×512 voxels. All data was downsampled by a factor of 2, resulting in volumes with $256^3$ voxels.

The thorax CT dataset was used to train, validate and test the models, while the additional head & neck dataset was used exclusively for testing the models on out-of-distribution data. The thorax CT dataset was partitioned into a training set of 260 scans, a validation set of 22 scans and a test set of 142 scans.

To simulate noisy projection data for the CT scans, Hounsfield units were converted into attenuation coefficients using $\mu=0.2\ cm^{-1}$ as the water linear attenuation coefficient. Attenuated projection data was corrupted by Poisson noise with $I_0=30000$ photons in Eq. (2).

For the evaluation study we considered the following baselines:

Feldkamp backprojection (FBP), known from Feldkamp, L. A., Davis, L. C., Kress, J. W., 1984, Practical cone-beam algorithm, J. Opt. Soc. Am. A 1, 612-619.

Primal-Dual Hybrid Gradient Algorithm (PDHG) with TV regularisation and U-net with FBP input, known from Chambolle, A., Pock, T., 2011, A first-order primal-dual algorithm for convex problems with applications to imaging, J. Math. Imaging Vis. 40, 120-145. We chose Hann filter with 0.9 frequency modulation for the FBP baseline by testing different combinations of filter and frequency on the training set. Parker weighting was used for FBP reconstruction with small FOV. For FBP reconstruction with large FOV setting it is important to take into account the fact that the central cylindrical region of the volume is measured by twice as many projections as the rest of the FOV, this may result in a reconstruction artifact in the form of a bright ring around the center of axial volume slices. To reduce this effect, one solution is to smoothly reduce intensity of projections in the detector region which captures twice as much data as we go from the detector center to the detector edge. We do so by multiplying all projections by a weighting factor.

For the PDHG baseline, we used 600 iterations, 0.25 weight for the TV regularization term. The parameters of PDHG were obtained via tuning on the train set as well.

Finally, as a deep learning baseline we implemented a 3D U-net for post-processing the FBP output. We used U-net with 3 downsampling layers, valid convolutions, 64 base filters and Parametric Rectified Linear Unit (PReLU) activations. 128×128×128 patches were used due to memory limitations. Adam optimizer with initial LR of 0.0001 and a plateau scheduler with linear warm-up and 10 epoch patience. The best-performing model on the validation set was used for testing. One 48 GB GPU was used for training the U-net's. It takes U-net+FBP approximately 10 seconds to reconstruct volumes for both geometries. PDHG takes 14 minutes to reconstruct a small FOV volume and 18 minutes to reconstruct a large FOV volume.

Evaluation of LIRE and the baseline methods was performed using PSNR and SSIM metrics restricted to the full field of view region, where $V_f>0$.

FIG. 5 shows the results for the test set of thorax CT scans and the out-of-distribution test set of head & neck CT scans.

FIG. 6 shows thorax CT axial slices for small FOV. Specifically, FIG. 6A shows a ground truth axial slice of Thorax CT with HU range=(−1000, 800), FIG. 6B shows an axial reconstruction slice generated by LIRE/small FOV, FIG. 6C shows an axial reconstruction slice generated by U-net/small FOV, FIG. 6D shows an axial reconstruction slice generated by FBP/small FOV, and FIG. 6E shows an axial reconstruction slice generated by PDHG/small FOV.

FIG. 7 shows thorax CT coronal slices for small FOV. Specifically, FIG. 7A shows a ground truth coronal slice of Thorax CT with HU range=(−1000, 800), FIG. 7B shows a coronal reconstruction slice generated by LIRE/small FOV, FIG. 7C shows a coronal reconstruction slice generated by U-net/small FOV, FIG. 7D shows a coronal reconstruction slice generated by FBP/small FOV, and FIG. 7E shows a coronal reconstruction slice generated by PDHG/small FOV.

FIG. 8 shows thorax CT axial slices for large FOV. Specifically, FIG. 8A shows a ground truth axial slice of Thorax CT with HU range=(−1000, 800), FIG. 8B shows an axial reconstruction slice generated by LIRE/large FOV, FIG. 8C shows an axial reconstruction slice generated by U-net/large FOV, FIG. 8D shows an axial reconstruction slice generated by FBP/large FOV, and FIG. 8E shows an axial reconstruction slice generated by PDHG/large FOV.

FIG. 9 shows thorax CT coronal slices for large FOV. Specifically, FIG. 9 shows a ground truth coronal slice of Thorax CT with HU range=(−1000, 800), FIG. 9B shows a coronal reconstruction slice generated by LIRE/large FOV, FIG. 9C shows a coronal reconstruction slice generated by U-net/large FOV, FIG. 9D shows a coronal reconstruction slice generated by FBP/large FOV, and FIG. 9E shows a coronal reconstruction slice generated by PDHG/large FOV.

FIG. 10 shows head & neck CT axial slices for large FOV. Specifically, FIG. 10A shows a ground truth axial slice of Head & Neck CT with HU range=(−1000, 1000), FIG. 10B shows an axial reconstruction slice generated by LIRE/large FOV, FIG. 10C shows an axial reconstruction slice generated by U-net/large FOV, FIG. 10D shows an axial reconstruction slice generated by FBP/large FOV, and FIG. 10E shows an axial reconstruction slice generated by PDHG/large FOV.

FIG. 11 shows head & neck CT coronal slices for large FOV. Specifically, FIG. 11A shows a ground truth coronal slice of Head & Neck CT with HU range=(−1000, 1000), FIG. 11B shows a coronal reconstruction slice generated by LIRE/large FOV, FIG. 11C shows a coronal reconstruction slice generated by U-net/large FOV, FIG. 11D shows a coronal reconstruction slice generated by FBP/large FOV, and FIG. 11E shows a coronal reconstruction slice generated by PDHG/large FOV.

The slices for the above-mentioned figures were taken from randomly chosen test volumes. We see that our method outperforms the classical and deep learning baselines in all cases, including the out-of-distribution test set. Compared to U-net+FBP, most notable is the improvement in SSIM, ranging from +0.05 to +0.08 on thorax CT data, and a much larger field-of-view, since LIRE is not constrained by the data sufficiency region of FBP. PSNR improvement over the U-net is +0.9 dB for small FOV and +0.13 dB for large FOV. On the out-of-distribution test set, we observe better generalization of LIRE compared to U-net+FBP in the form of an increased PSNR and SSIM gap between LIRE and U-net, even though LIRE has a slightly higher parameter count, allowing to suggest that primal-dual schemes with shallow U-nets generalize better than a single deep U-net. Visual inspection of thorax CT slices show better visibility of lung fissures in LIRE reconstructions compared to the baselines. In head & neck CT slices, we observe that U-net loses spatial resolution and introduces a strong 'shadow' in the neck region. LIRE yields best reconstructions on the head & neck CT set due to better handling of photon noise compared to the iterative method, but in the low-noise neck region we observe that the methods are quite close in visual image quality.

Additionally, we measured the performance of LIRE and PDHG on the test set of thorax CT data for the small FOV setting in the region where $V_f=0$, $V_p=1$, consisting of the voxels in the partial field of view which do not belong to the full field of view. This way we obtained mean PSNR of 16.938 and mean SSIM of 0.233 for PDHG, whereas for LIRE mean PSNR was 28.156and mean SSIM was 0.795.

The techniques disclosed herein provide a practical algorithm for deep leaning-based CBCT reconstruction with clinically-relevant resolution and projection count using a learned primal-dual scheme that can be trained end-to-end on current consumer hardware. The test results show that the method outperforms the classical and deep learning baselines on the test set of thorax CT scans and the out-of-distribution test set of head & neck CT scans, where additionally better generalization of our method was observed compared to the U-net baseline. In particular, the photon noise in highly attenuated areas is handled very well, which indicates that embodiments of the present disclosure can potentially help to lower the dose of CBCT scans. For the small field of view setting, our method is able to reconstruct certain anatomy details outside the full field of view much better than the iterative baseline, which can be interesting for applications in radiotherapy, e.g., by allowing for a better registration of the planning CT scan to the CBCT reconstruction.

Scatter correction may be incorporated in embodiments of the present disclosure. For example, supervised scatter correction with deep learning may be incorporated in the learned primal-dual scheme and trained end-to-end. Supervised scatter correction with deep learning is known by itself from Maier, J., Berker, Y., Sawall, S., Kachelriess, M., 2018, Deep scatter estimation (DSE): feasibility of using a deep convolutional neural network for real-time x-ray scatter prediction in cone-beam CT, in: Medical Imaging 2018: Physics of Medical Imaging, International Society for Optics and Photonic, SPIE, pp. 393-398.

According to an aspect of the invention, a system for image reconstruction using a learned iterative scheme may be provided, the system comprising a memory for storing data and instructions; and a processor system configured to control, when executing the instructions: obtaining (201) measured data defined in a dual space, the measured data relating to a primal space; determining (203) dual parameters defined in the dual space based on the measured data; determining (203) primal parameters defined in the primal space based on the dual parameters; iteratively (210) updating the primal parameters (206) and the dual parameters (205), by iteration of applying (205) a dual-space learned invertible operator to the dual parameters, in dependence on at least part of the dual parameters, to obtain updated dual parameters, and applying (206) a primal-space learned invertible operator to the primal parameters, in dependence on at least part of the primal parameters, to obtain updated primal parameters; and determining (207) an image in the primal space based on the updated primal parameters.

In such a system, the processor system may be further configured to control, in each iteration, calculating auxiliary dual parameters (205*a*) based on at least part of the primal parameters, wherein the dual-space learned invertible operator is further dependent on the auxiliary dual parameters; and calculating auxiliary primal parameters (206*a*) based on at least part of the dual parameters, wherein the primal-space learned invertible operator is further dependent on the auxiliary primal parameters.

For example, the calculating the auxiliary dual parameters (205*a*) may comprise forward-projecting the second primal parameters; and the calculating the auxiliary primal parameters (206*a*) may comprise back-projecting the second dual parameters.

For example, the processor system may be further configured to control organizing (204) the dual parameters in a plurality of dual channels, each dual channel corresponding to the dual space, and dividing the dual channels into first dual channels containing first dual parameters and second dual channels containing second dual parameters; and organizing (204) the primal parameters in a plurality of primal channels, each primal channel corresponding to the primal space, and dividing the primal channels into first primal channels containing first primal parameters and second primal channels containing second primal parameters, wherein the applying (205) the dual-space learned invertible operator to the dual parameters comprises updating the second dual parameters based on an output of a dual-space learned model without changing the first dual parameters, and wherein the applying (206) the primal-space learned invertible operator to the primal parameters comprises updating the second primal parameters based on an output of a primal-space learned model without changing the first primal parameters. For example, the processor system may be further configured to control permuting (209) the dual channels to mix the first dual channels and the second dual channels; and permuting (209) the primal channels to mix the first primal channels and the second primal channels.

For example, the processor system may be further configured to control, in each iteration, updating (207) the image in the primal space based on the updated primal parameters.

For example, the processor system may be further configured to control obtaining an updated image (207) in the primal space by updating the image in the primal space based on the updated primal parameters, wherein the calculating (205*a*) the auxiliary dual parameters further comprises forward-projecting the updated image in the primal space; and wherein the primal-space learned invertible operator is further dependent on the updated image.

For example, the processor system may be further configured to control calculating (206*b*) an error term based on the updated image in the primal space and the measured data defined in the dual space, wherein at least one of the primal-space learned invertible operator and the dual-space learned invertible operator is dependent on the error term.

For example, the measured data may comprise cone-beam X-ray projection data.

For example, the processor system may be further configured to control training the dual-space learned invertible operator and the primal-space learned invertible operator, based on a train set. Some or all aspects of the invention may be suitable for being implemented in form of software, in particular a computer program product. The computer program product may comprise a computer program stored on a non-transitory computer-readable media. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the spirit and scope of the present disclosure, as defined by the appended claims and their equivalents. Reference signs placed in parentheses in the claims shall not be interpreted to limit the scope of the claims. Items described as separate entities in the claims or the description may be implemented as a single hardware or software item combining the features of the items described.

The invention claimed is:

1. A system for image reconstruction using a learned iterative scheme, the system comprising a memory for storing data and instructions; and a processor system configured to control, when executing the instructions:

obtaining measured data defined in a dual space, the measured data relating to a primal space;

determining dual parameters defined in the dual space based on the measured data;

determining primal parameters defined in the primal space based on the dual parameters;

identifying a plurality of primal patches, each primal patch representing a sub-volume of the primal space, wherein the primal space is divided into the plurality of the primal patches;

identifying a plurality of dual patches, each dual patch representing a subset of the dual space, wherein the dual space is divided into the plurality of the dual patches;

iteratively updating the primal parameters and the dual parameters, by iteration of applying a dual-space learned invertible operator to the dual parameters, in dependence on at least part of the dual parameters, to obtain updated dual parameters, wherein the dual-space learned invertible operator is calculated separately for each dual patch, and applying a primal-space learned invertible operator to the primal parameters, in dependence on at least part of the primal parameters, to obtain updated primal parameters, wherein the primal-space learned invertible operator is calculated separately for each primal patch; and determining an image in the primal space based on the updated primal parameters.

2. The system of claim 1, wherein the plurality of patches overlap each other.

3. The system of claim 1, wherein the subset of the dual space comprises a rectangular area of a projection.

4. The system of claim 1, wherein the processor system is further configured to control, in each iteration:

calculating auxiliary dual parameters based on at least part of the primal parameters, wherein the dual-space learned invertible operator is further dependent on the auxiliary dual parameters; and calculating auxiliary primal parameters based on at least part of the dual parameters, wherein the primal-space learned invertible operator is further dependent on the auxiliary primal parameters.

5. The system of claim 4, wherein the calculating the auxiliary dual parameters comprises forward-projecting the second primal parameters; and the calculating the auxiliary primal parameters comprises back-projecting the second dual parameters.

6. The system of claim 1, wherein the processor system is further configured to control:

organizing the dual parameters in a plurality of dual channels, each dual channel corresponding to the dual space, and dividing the dual channels into first dual channels containing first dual parameters and second dual channels containing second dual parameters; and organizing the primal parameters in a plurality of primal channels, each primal channel corresponding to the primal space, and dividing the primal channels into first primal channels containing first primal parameters and second primal channels containing second primal parameters, wherein the applying the dual-space learned invertible operator to the dual parameters comprises updating the second dual parameters based on an output of a dual-space learned model without changing the first dual parameters, wherein the output of the dual-space learned model is calculated separately for each dual patch, and wherein the applying the primal-space learned invertible operator to the primal parameters comprises updating the second primal parameters based on an output of a primal-space learned model without changing the first primal parameters, wherein the output of the primal-space learned model is calculated separately for each primal patch.

7. The system of claim 6, wherein the processor system is further configured to control:

permuting the dual channels to mix the first dual channels and the second dual channels; and permuting the primal channels to mix the first primal channels and the second primal channels.

8. The system of claim 1, wherein the processor system is further configured to control, in each iteration: updating the image in the primal space based on the updated primal parameters.

9. The system of claim 8, wherein the processor system is further configured to control calculating an error term based on the updated image in the primal space and the measured data defined in the dual space, and wherein at least one of the primal-space learned invertible operator and the dual-space learned invertible operator is dependent on the error term.

10. The system of claim 1, wherein the processor system is further configured to control:

obtaining an updated image in the primal space by updating the image in the primal space based on the updated primal parameters, and wherein the calculating the auxiliary dual parameters further comprises forward-projecting the updated image in the primal space; and wherein the primal-space learned invertible operator is further dependent on the updated image.

11. The system of claim 1, wherein the measured data comprise cone-beam X-ray projection data.

12. The system of claim 1, wherein the processor system is further configured to control training the dual-space learned invertible operator and the primal-space learned invertible operator, based on a train set.

13. A method of image reconstruction using a learned iterative scheme, the method comprising obtaining measured data defined in a dual space, the measured data relating to a primal space;

determining dual parameters defined in the dual space based on the measured data;

determining primal parameters defined in the primal space based on the dual parameters;

identifying a plurality of primal patches, each primal patch representing a sub-volume of the primal space, wherein the primal space is divided into the plurality of the primal patches;

identifying a plurality of dual patches, each dual patch representing a subset of the dual space, wherein the dual space is divided into the plurality of the dual patches;

iteratively updating the primal parameters and the dual parameters, by iteration of applying a dual-space learned invertible operator to the dual parameters, in dependence on at least part of the dual parameters, to obtain updated dual parameters, wherein the dual-space learned invertible operator is calculated separately for each dual patch, and applying a primal-space learned invertible operator to the primal parameters, in dependence on at least part of the primal parameters, to obtain updated primal parameters, wherein the primal-space learned invertible operator is calculated separately for each primal patch; and determining an image in the primal space based on the updated primal parameters.

14. A non-transitory computer-readable media with a computer program product stored thereon, comprising instructions to cause a computer system, when executing the instructions, to perform the method of claim 13.

* * * * *